(12) United States Patent
Celikyilmaz et al.

(10) Patent No.: US 10,817,957 B2
(45) Date of Patent: Oct. 27, 2020

(54) SYSTEMS AND METHODS TO DETECT CHANGES IN MERCHANT IDENTIFICATION INFORMATION

(71) Applicant: Visa International Service Association, San Francisco, CA (US)

(72) Inventors: Ilker Celikyilmaz, Mountain View, CA (US); Sashideep Chanda, Pleasanton, CA (US); Raman Chinnappan, Foster City, CA (US); Basudeb Ghosh, Foster City, CA (US); Kalpana Jogi, San Francisco, CA (US); Mahesh Govind Joshi, Belmont, CA (US); Muhammad Bassam Adil Khan, San Mateo, CA (US)

(73) Assignee: Visa International Services Association, San Francisco, CA (US)

( * ) Notice: Subject to any disclaimer, the term of this patent is extended or adjusted under 35 U.S.C. 154(b) by 50 days.

(21) Appl. No.: 16/294,373

(22) Filed: Mar. 6, 2019

(65) Prior Publication Data

US 2019/0205994 A1 Jul. 4, 2019

Related U.S. Application Data

(63) Continuation of application No. 14/734,342, filed on Jun. 9, 2015, now Pat. No. 10,269,077.
(Continued)

(51) Int. Cl.
*G06Q 40/00* (2012.01)
(52) U.S. Cl.
CPC .................... *G06Q 40/12* (2013.12)
(58) Field of Classification Search
CPC ................................................. G06Q 20/12
See application file for complete search history.

(56) References Cited

U.S. PATENT DOCUMENTS 5,930,830 A 7/1999 Mendelson et al.
6,081,789 A 6/2000 Purcell
(Continued)

FOREIGN PATENT DOCUMENTS

JP 2001306876 A 11/2011
KR 20060012105 A 2/2006
KR 20060130469 A 12/2006

OTHER PUBLICATIONS

International Patent Application PCT/US2009/055251, International Search Report and Written Opinion, dated Apr. 20, 2010.
(Continued)

*Primary Examiner* — Florian M Zeender
*Assistant Examiner* — Joseph M Mutschler
(74) *Attorney, Agent, or Firm* — The Webb Law Firm

(57) ABSTRACT

A system and method to detect changes in transaction parameters for the identification of a store of the merchant in a payment processing network. The system is configured to monitor input data, such as acquirer's merchant master file (AMMF), transaction records, to detect transaction parameters of a processing entity that partially match with the transaction parameters associated with an external, persistent identifier of the merchant and/or the store of the merchant, determine a change or difference introduced in the detect transaction parameters, and update the set of transaction parameters associated with the persistent identifier of the store of the merchant that can be used to identify the set of transaction parameters of the store in a communication external to the communication system of the payment processing network.

20 Claims, 12 Drawing Sheets

Related U.S. Application Data

(60) Provisional application No. 62/009,692, filed on Jun. 9, 2014.

(56) References Cited

U.S. PATENT DOCUMENTS

| | | |
|---|---|---|
| 6,868,391 B1 | 3/2005 | Hultgren |
| 6,944,677 B1 | 9/2005 | Zhao |
| 7,103,165 B2 | 9/2006 | Baniak et al. |
| 7,324,999 B2 | 1/2008 | Judd |
| 7,606,730 B2 | 10/2009 | Antonucci |
| 8,055,581 B2 | 11/2011 | Royyuru et al. |
| 8,527,474 B2 | 9/2013 | Hardy-McGee |
| 8,561,896 B2 | 10/2013 | Hammond et al. |
| 8,612,317 B1 | 12/2013 | Harman et al. |
| 8,620,738 B2 | 12/2013 | Fordyce, III et al. |
| 8,639,587 B1 | 1/2014 | Whang |
| 8,706,557 B1 | 4/2014 | Tavares |
| 8,708,233 B2 | 4/2014 | Hammond et al. |
| 8,738,418 B2 | 5/2014 | Winters |
| 8,843,391 B2 | 9/2014 | Fordyce, III et al. |
| 9,159,084 B2 | 10/2015 | Magpayo et al. |
| 2002/0111842 A1 | 8/2002 | Miles |
| 2004/0054625 A1 | 3/2004 | Kellogg et al. |
| 2004/0230536 A1 | 11/2004 | Fung et al. |
| 2005/0022006 A1 | 1/2005 | Bass et al. |
| 2005/0027648 A1 | 2/2005 | Knowles et al. |
| 2005/0033675 A1 | 2/2005 | Nakashima et al. |
| 2006/0212407 A1 | 9/2006 | Lyon |
| 2006/0224514 A1 | 10/2006 | Buschi et al. |
| 2007/0250920 A1 | 10/2007 | Lindsay |
| 2008/0015954 A1 | 1/2008 | Huber et al. |
| 2008/0071859 A1 | 3/2008 | Seed et al. |
| 2008/0177797 A1 | 7/2008 | Eldering et al. |
| 2009/0048916 A1 | 2/2009 | Nuzum et al. |
| 2009/0228365 A1 | 9/2009 | Tomchek et al. |
| 2010/0010889 A1 | 1/2010 | Antonucci |
| 2010/0057786 A1 | 3/2010 | Hardy-McGee |
| 2010/0161484 A1 | 6/2010 | Leggatt et al. |
| 2011/0087550 A1 | 4/2011 | Fordyce, III et al. |
| 2011/0191252 A1 | 8/2011 | Dai |
| 2011/0231223 A1 | 9/2011 | Winters |
| 2011/0264543 A1 | 10/2011 | Taveau et al. |
| 2012/0005076 A1 | 1/2012 | Dessert et al. |
| 2012/0203663 A1 | 8/2012 | Sinclair et al. |
| 2012/0203666 A1 | 8/2012 | Torossian et al. |
| 2013/0046635 A1 | 2/2013 | Grigg et al. |
| 2013/0066782 A1 | 3/2013 | Diamond |
| 2013/0073464 A1* | 3/2013 | Magpayo ............ G06Q 30/0256 705/44 |
| 2013/0124417 A1 | 5/2013 | Spears et al. |
| 2013/0132196 A1 | 5/2013 | Hurst |
| 2013/0185166 A1 | 7/2013 | Larkin |
| 2013/0185192 A1 | 7/2013 | McGuire |
| 2013/0211900 A1 | 8/2013 | Dessert |
| 2013/0246203 A1 | 9/2013 | Laracey |
| 2013/0262313 A1* | 10/2013 | Martin ................ G06Q 40/00 705/44 |
| 2013/0275303 A1 | 10/2013 | Fiore et al. |
| 2013/0290707 A1 | 10/2013 | Sinclair et al. |
| 2014/0258246 A1 | 9/2014 | Lo Faro et al. |
| 2014/0337205 A1 | 11/2014 | Tavares |
| 2015/0262310 A1* | 9/2015 | Howe ................ G06Q 20/202 705/30 |
| 2015/0356556 A1 | 12/2015 | Celikyilmaz et al. |

OTHER PUBLICATIONS

International Patent Application PCT/US2009/055254, International Search Report and Written Opinion, dated Apr. 12, 2010.
International Patent Application PCT/US2009/055257, International Search Report and Written Opinion, dated Mar. 29, 2010.
International Patent Application PCT/US2009/055259, International Search Report and Written Opinion, dated Apr. 12, 2010.
International Patent Application PCT/US2015/034123, International Search Report and Written Opinion, dated Aug. 24, 2015.
QPCA for Merchants, VISA, Sep. 7, 2007.

* cited by examiner

Merchant Onboarding
Find merchants to onboard or upload merchants to onboard

| Find Merchants | Upload Merchants | Merchant History |

Find Merchant By: ● Transaction ○ Address ○ Enterprise Fields •••

Merchant Name: Roro BBQ
Address: 10800 8th NE Street
City: Bellevue    State: WA    Postal Code: 98004
User Alias: rgupta1@visa.com
Transaction Date: December 14 2012
Transaction Amount: 0.01

[Find Matches]  [Clear]

Search Results:
1 of 1 Merchant(s)

| Merchant ID | Merchant Name | Store ID | Store Name | Client | Status |
|---|---|---|---|---|---|
| 1234567890 | RORO0123456789 | 01232 | XYZ1235 | | Match Found |

1 of 1 Merchant(s)                    Onboard Merchant to: -- Select Client --

FIG. 2

SYSTEMS AND METHODS TO DETECT CHANGES IN MERCHANT IDENTIFICATION INFORMATION

CROSS REFERENCE TO RELATED APPLICATIONS

The present application is a continuation of U.S. application Ser. No. 14/734,342, filed Jun. 9, 2015, which claims the benefit of U.S. Provisional Application No. 62/009,692, filed Jun. 9, 2014, the disclosures of which are hereby incorporated in their entireties by reference.

The present application relates to U.S. patent application Ser. No. 14/729,537, filed Jun. 3, 2015, and entitled "Systems and Methods to Register Merchants for Data Processing in an Electronic Transaction System", U.S. patent application Ser. No. 13/624,778, filed Sep. 21, 2012, assigned U.S. Pat. App. Pub. No. 2013/0073464, and entitled "Systems and Methods to Communicate via a Merchant Aggregator", and U.S. Pat. No. 8,706,557, issued Apr. 22, 2014 and entitled "Systems and Methods to Identify Merchants", the entire disclosures of which are incorporated herein by reference.

FIELD OF THE TECHNOLOGY

At least some embodiments disclosed in the present application relate to registering merchants in general and more particularly but not limited to registering merchants for data processing in an electronic transaction system in connection with data generated outside the electronic transaction system and detecting changes of the registration information.

BACKGROUND

U.S. Pat. App. Pub. No. 2013/0073464 discloses a system configured to enroll a merchant in an add-on service of an electronic transaction processing system by conducting a transaction using a predetermined account on a transaction terminal of the merchant. A portal is provided to facilitate the match of the transaction record as stored in the transaction processing system and the transaction record as stored in a merchant aggregator that enrolls the merchant. Through the matching of the transaction records, the merchant ID used to identify the merchant in the transaction processing system is linked with the merchant identifier of the merchant aggregator used to represent the merchant outside the transaction processing system.

U.S. Pat. No. 8,706,557 discloses a mobile application configured to generate a transaction at a transaction terminal of a merchant to provide information about the merchant, such as the GPS location and a merchant identifier used to identify the merchant outside an electronic transaction processing system, to the transaction processing system via an authorization request of the transaction and/or communications with the portal of the transaction processing system. Through the use of the mobile application, information about the merchant is associated with the identification information that is used to identify the transaction terminal in the transaction processing system.

The entire disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

FIG. 2 illustrates a user interface configured to obtain a store identifier representing a set of parameters that are used in transaction messages for payments to a merchant and that can be used to identify a store of the merchant according to one embodiment.

DETAILED DESCRIPTION

In one embodiment, a user interface is configured to allow a merchant to search and identify a set of transaction parameters that are used in authorization and/or settlement messages of payment transactions initiated for a store of the merchant and allow the merchant to obtain an identifier representing the set of transaction parameters that can be subsequently used to determine whether a transaction currently being processed in an electronic transaction processing network is initiated for the store of the merchant.

For example, a merchant may have multiple stores/retail locations. The merchant may have different offers for the different stores/retail locations that are configured to be processed differently by the electronic payment processing network. The identifier representing the set of transaction parameters of a particular store of the merchant can be used to tell apart the transactions made for the particular store of the merchant from transactions made for other stores of the merchant and/or transactions made for other merchants.

For example, a data warehouse in an electronic payment processing network is configured in one embodiment to store data associating the set of transaction parameters with the identifier provided to the merchant; and the identifier can be subsequently used to identify items of the store of the merchant, such as offers, incentives, loyalty programs of the store of the merchant that are communicated in ways separate from communications of the authorization and/or settlement messages for payment transactions. Such items are generally communicated outside the electronic payment processing network in a way separate from authorization or settlement messages transmitted within the electronic payment processing network for payment transactions initiated for the store of the merchant). The identifier can be used to indicate that the items of the store of the merchant are relevant to authorization and/or settlement messages of payment transactions that have the set of transaction parameters represented by the identifier. For example, when data fields of an authorization request contain data matching the set of transaction parameters represented by the identifier, the authorization request can be determined to be relevant to the items that are associated with the identifier representing the set of transaction parameters.

Figure 1:
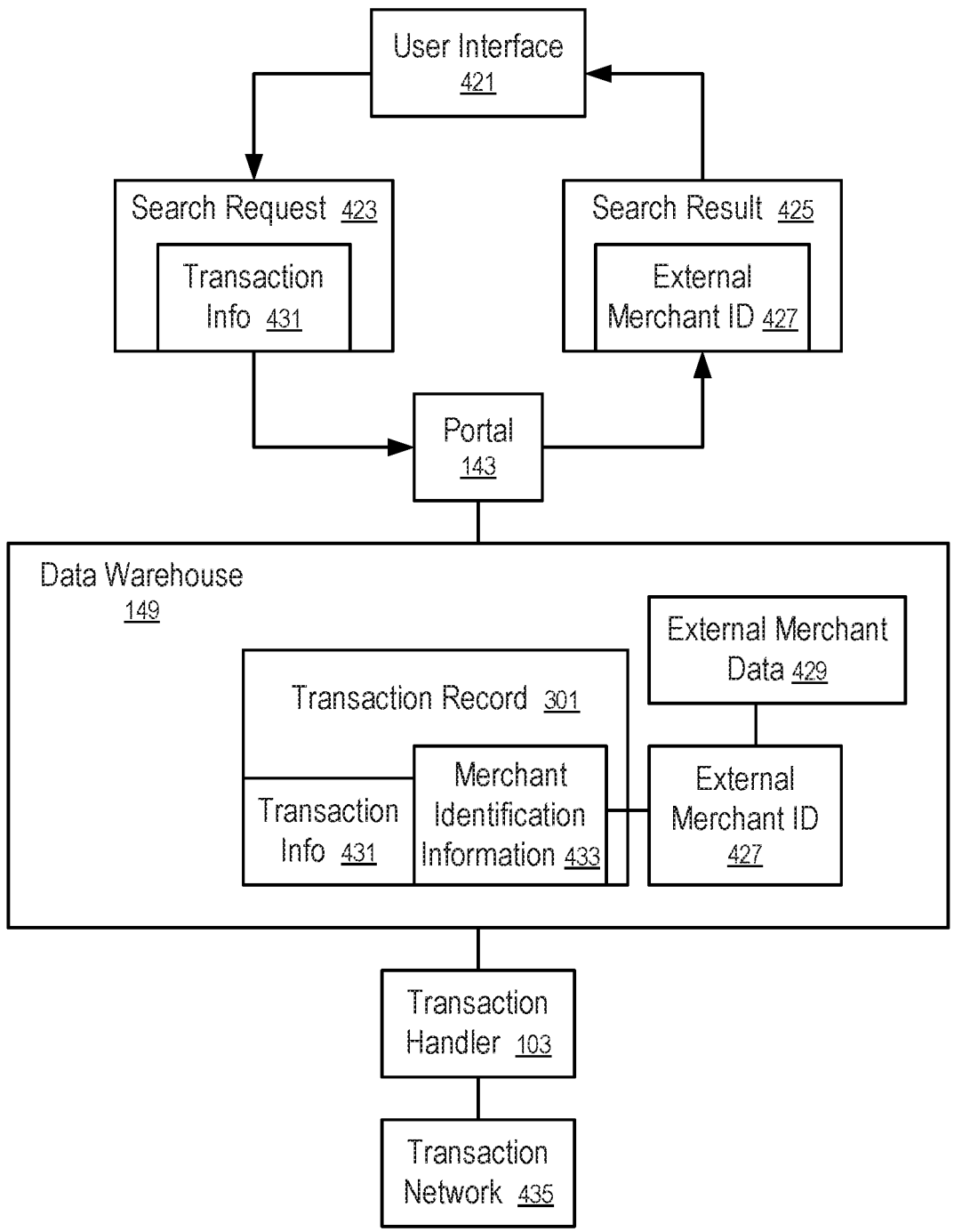
FIG. 1 shows a system configured to register merchants for services provided based on transaction processing in an electronic transaction processing system and data generated external to an electronic transaction processing system.

FIG. 1 shows a system configured to register merchants for services provided based on transaction processing in an electronic transaction processing system and data generated external to the electronic transaction processing system.

In FIG. 1, a transaction handler (103) is connected in an electronic transaction processing network (435) to generate transaction records (301) of transactions authorized via the processing at the transaction handler (103).

The transaction record (301) typically includes transaction information (431), such as the date and time of the transaction and the amount of the transaction, and merchant identification information (433), such as acquirer bank identification number, card acceptor, terminal ID, merchant address and/or merchant name. The transaction record (301) further includes other information such as account information identifying the consumer account from which the payment is made.

The merchant address and/or merchant name used in authorization messages may be variation of the merchant address and/or merchant name used in business communications of the merchant outside the transaction network. For example, abbreviations may be used to shorten the merchant address and/or merchant name expressed in authorization messages such that the communication efficiency of the transaction network (435) can be improved. Thus, it is a challenge to accurate correlate the merchant address and/or merchant name used in authorization messages and the merchant address and/or merchant name used communications outside the transaction network.

A combination of a card acceptor and terminal ID can be used to uniquely identify a particular transaction terminal. However, a merchant typically has multiple transaction terminals in a store of the merchant. It is inefficient to enumerate the individual transaction terminals for a store in communications related to the store of the merchant.

Acquirer bank identification number may not uniquely identify a store of a merchant, because different stores of the merchant may use the same acquirer bank identification number. On the other side, a merchant may use multiple acquirer bank identification numbers for transaction terminals disposed in the same store.

In FIG. 1, to reliably register a store of a merchant, the system provides a portal (143) to search for merchant identification information (433) of the store of the merchant and obtain an external merchant ID (427) representing merchant identification information (433) of the store of the merchant. Thus, in subsequent communications of external merchant data (429) that is generated outside of the transaction network (435) (e.g., data not originated or initiated from authorization requests of transactions processed in the transaction network (435)), the external merchant ID (427) can be used to tag the external merchant data (429) and thus specify that the external merchant data (429) is relevant to the merchant identification information (433) represented by the external merchant ID (427).

In FIG. 1, a portal (143) is configured to facilitate the search via a user interface (421). For example, the portal (143) is configured in one embodiment to present a web document to a web browser, causing the web browser to present the user interface (421) in accordance with the web document. Using the user interface (421) a representative of the merchant may submit a search request (423) containing transaction info (431) specified as a search criterion.

After the portal (143) receives the search request (423), the portal searches the data warehouse (149) for the transaction record (301) that has the transaction info (431) in the respective data fields of the transaction record (301) and retrieves the merchant identification information (433) from data fields such as acquirer bank identification number, card acceptor, terminal ID, merchant address and/or merchant name. The merchant identification information (433) of a transaction record identifies a transaction terminal of the merchant from which the corresponding transaction is initiated.

In some instances, the transaction info (431) may match multiple transaction records having different merchant identification information (433) that corresponds to one or more transaction terminals of the merchant.

In some embodiments, the portal (143) groups and presents identifications of different transaction terminals as candidates for store identification. Alternatively or in combination, the user may use the user interface (421) to selectively group the transaction terminals and/or update the grouping of the transaction terminals for different stores or retail locations.

In FIG. 1, the portal (143) is configured to generate an external merchant ID (427) representing the set of merchant identification information (433) grouped to represent the transaction terminals of a particular store of the merchant and present the external merchant ID (427) as an identifier of the store of the merchant in the search result (425) provided on the user interface.

In some embodiments, the search result (425) includes a tool that allows a user to provide input to select the merchant identification information (433) of a subset of matching transaction terminals for association with the external merchant ID (427).

After the external merchant ID (427) is associated with the merchant identification information (433) of one or more transaction terminals in the particular store of the merchant, the portal (143) can receive an input of the external merchant data (429) that is tagged with the external merchant ID (427) to instruct the transaction handler to detect transactions that have data fields matching the merchant identification information (433) represented by the external merchant ID (427) and further process the external merchant data (429) in connection with the detected transactions.

In one embodiment, the system is configured to accurate correlate merchants as non-processing entities known outside a communication system for payment transaction processing with respective merchants as processing entities known inside the communication system for payment transaction processing.

For example, in a communication system of an electronic payment transaction processing network, one or more parameters transmitted in the communication system, such as card acceptor, terminal ID, merchant address and/or name provided in authorization messages or settlement messages of payment transactions, may be used to identify the merchants as processing entities in the electronic payment processing network. In a separate communication system outside the communication system of the payment transaction processing network, the same merchants may be identified via other parameters as non-processing entities in a context outside the electronic payment processing network. For example, offers and incentives of the merchants may be communicated in an advertising network outside the communication system of the electronic payment processing network that uses a transaction handler to interconnect acquirer processors controlling merchant accounts and issuer processors controlling consumer payment accounts. Accurately correlating the processing entities of the merchants with the non-processing entities of the merchants enables the redemption of the benefits of the offers and incentives in connection with the transactions to make payments to the merchants and provide real time communications regarding the offers and incentives to consumers during the processing of the payment transactions.

In one embodiment, to accurately correlating the processing entities of the merchants with the non-processing entities of the merchants, a user interface is configured to allow a merchant to obtain a unique identifier that represents the merchant as a processing entity and use the identifier in association with non-processing activities (e.g., offer programs, loyalty programs). Through the use of the user interface, the transaction processing parameters used in the communication system of the payment processing network (e.g., acquirer bank identification number, card acceptor, terminal ID, merchant address and/or name that are provided in authorization messages or settlement messages of transactions for payments to the merchant) are identified and associated with the unique identifier that represents the merchant and/or the store of the merchant. Thus, the transaction processing parameters associating with the processing entity of the merchant in the communication system of the payment processing network are associated with the unique identifier. When an item (e.g., offer) of the merchant is identified to be associated with the unique identifier assigned to the merchant and/or the store of the merchant, the item can be determined to be associated with the transaction processing parameters. In response to a message in the communication system of the payment processing network for a payment transaction being processed by the payment processing network, the system can determine whether or not the payment transaction is for the merchant and/or the store of the merchant, based on the association of the unique identifier used as part of the identification of the item and the transaction processing parameters represented by the unique identifier. If the transaction processing parameters in the message of the payment transaction match with the transaction processing parameters represented by the unique identifier, the payment transaction is considered for the merchant and/or the store of the merchant and thus relevant to the item; and otherwise, the payment transaction is not considered for the merchant and/or the store of the merchant and thus irrelevant to the item.

In one embodiment, the unique identifier is a persistent identifier that identifies the merchant and/or the store of the merchant. Within the communication system of the payment processing network, the unique identifier associated with transaction processing parameters that can be used to determine whether or not a message for a payment transaction is for the merchant and/or the store of the merchant. Outside the communication system of the payment processing network, the unique identifier is used to identify which items are for the merchant and/or the store of the merchant. In combination, the unique identifier links the items of the merchant and/or the store of the merchant to the transaction processing parameters of the merchant and thus enable the determination of whether a message for a payment transaction transmitted in the communication system of the payment processing network is relevant to the items of the merchant and/or the store of the merchant.

In one embodiment, merchant information is organized in merchant hierarchy, such as a chain that has many stores, a store has many transaction terminals, etc. A merchant may search for the database to request the unique identifier that is used to represent the merchant as a processing entity in the hierarchy. The search may be by acquirer and bank identification number (BIN), store address, merchant names, past transactions, etc. Subsequently, the merchant may use the unique identifier in any related services to identify the merchant as the processing entity in the payment processing system.

FIG. 2 illustrates a user interface configured to obtain a store identifier representing a set of parameters that are used in transaction messages for payments to a merchant and that can be used to identify a store of the merchant according to one embodiment.

In FIG. 2, the user interface allows a representative of a merchant to search for processing entities as known in the communication system of the payment processing network that correspond to the store of the merchant.

For example, the representative of the merchant may select the option to find merchants by transaction. For example, the representative of the merchant may specify, in the user interface, the parameters of the payment transactions made in the store of the merchant to request the user interface to identify payment transactions matching the specified parameters. Examples of the parameters include the date of transaction, the amount of the transaction, the address of the transaction, etc.

In one embodiment, such transactions made to identify the store of the merchant are to be made using a predetermined payment account known to the system; and thus, the representative of the merchant does not have to identify the account information of the payment account. Alternatively, the transactions made to identify the store of the merchant are to be made using a payment account chosen by a representative of the merchant; and the user interface may request the account information of the payment account to identify the transaction(s) made to identify the store of the merchant. When the store of the merchant has multiple transaction terminals, one or more transactions are to be made using each of the transaction terminals in the store of the merchant.

After the transactions made to identify the store of the merchant are found and confirmed via the user interface, the system is configured to extract the transaction processing parameters from the messages transmitted within the payment processing network for the transactions and assign an store ID to represent the transaction processing parameters of store of the merchant. The user interface presents the store ID to the representative to the merchant, such that the merchant may use the store ID to identify non-processing items, such as offers, loyalty programs, incentives, as being associated with the set of transaction processing parameters of the store of the merchant.

In an alternative option, the transaction processing parameters of the store of the merchant may be found via searching based on the address and/or name of merchants provided by the acquirers of the respective merchants. Since the addresses and names provided by acquirers to identify merchants may have different variations, spelling, and/or abbreviation from the corresponding information provided by the representative of the merchant in the user interface, the system is configured to provide search results that may have a partial match. The processing entities that are identified by the acquirers and that at least partially match with the search criterion specified in the user interface are listed in the search result; and the representative of the merchant may select the entities that are believed to correspond to the store of the merchant. The one or more transaction processing parameters of the processing entities selected by the representative of the merchant from the search results are then assigned a unique store ID that can be used to identify non-processing items of the store of the merchant.

In one embodiment, the user interface is configured to provide an option to allow the representative of the merchant to search using the merchant ID assigned by an acquirer to the merchant.

In one embodiment, the user interface is configured to provide an option to allow the Representative of the merchant to search using the card acceptor ID and acquirer bank identification number assigned by an acquirer to the transaction terminals located in the store of the merchant.

In one embodiment, the user interface allows the representative of the merchant to find the processing entities currently associated with the unique store ID of the merchant, review the details of the information about the processing entities, and provide updates and/or corrections.

In one embodiment, a merchant may have different stores at different locations. The user interface is configured to allow the representative to obtain a merchant identifier uniquely representing the merchant among various merchants and different store identifiers to uniquely represent each store of the merchant among the stores of the merchants (and/or among the stores of various merchants).

Figure 3:
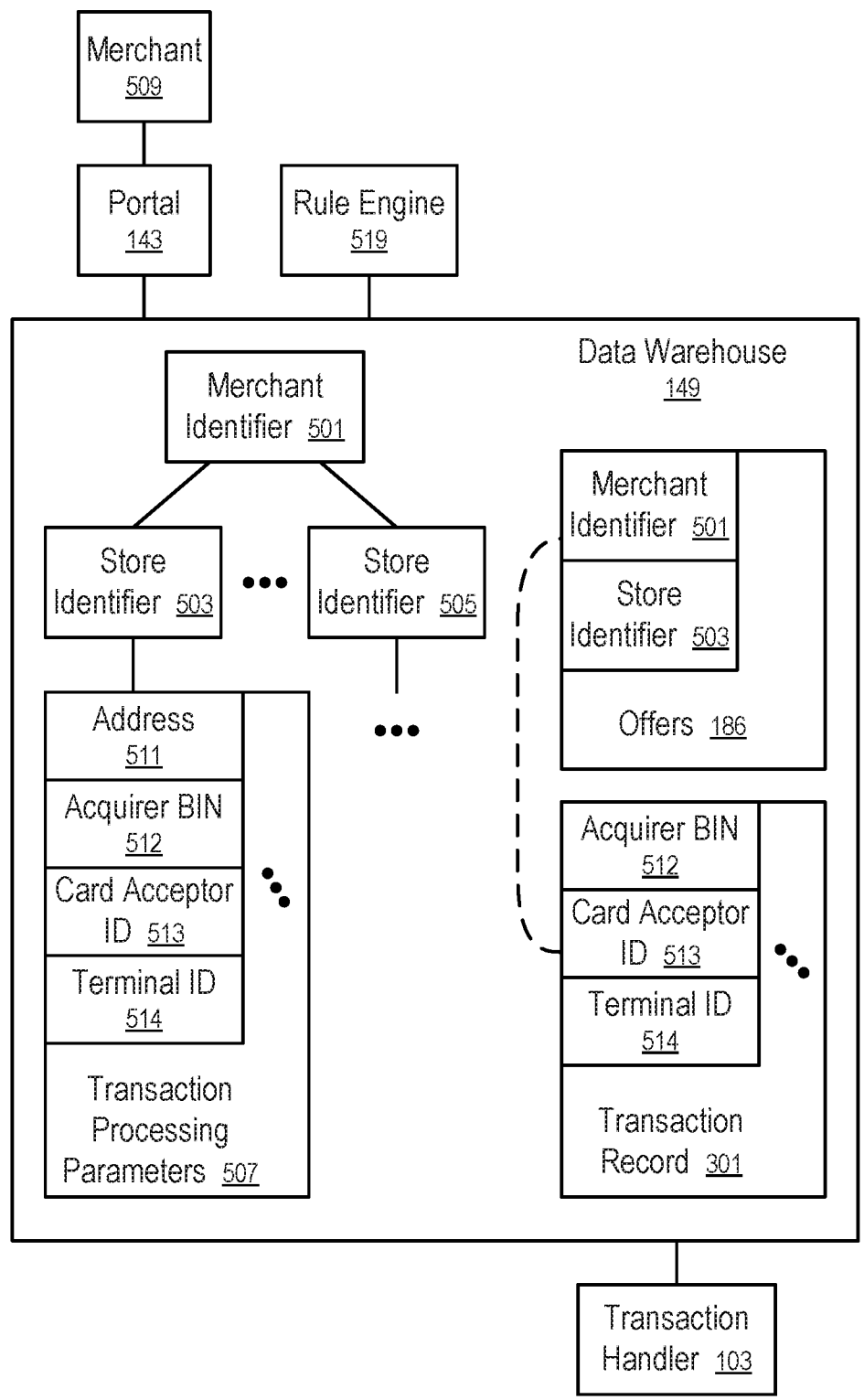
FIG. 3 illustrates a system configured to determine whether a payment transaction is relevant to an item of a merchant according to one embodiment.

FIG. 3 illustrates a system configured to determine whether a payment transaction is relevant to an item of a merchant according to one embodiment.

In FIG. 3, the portal (143) is configured to provide a user interface for the merchant to obtain the merchant identifier and/or the store identifiers for labeling non-processing items, such as the user interface illustrated in FIG. 2.

In FIG. 3, the merchant identifier (501) is stored in the data warehouse (149) in association with one or more store identifiers (503, ... , 505), each of which store identifiers represents a store of the merchant (509).

In FIG. 3, the user interface presented by the portal (143) allows the merchant to identify the transaction processing parameters (507) that can be used to determine whether nor not a transaction is for the store represented by the corresponding store identifier. For example, the transaction processing parameters (507) may include the information assigned by the acquirers to identify the merchants, such as merchant address (511), acquirer bank identification number (BID) (512), card acceptor ID (514), terminal ID (514), etc. When the store uses multiple transaction terminals, the set of transaction processing parameters (507) may include multiple card acceptor IDs (e.g., 514), terminal IDs (e.g., 514), etc.

In some embodiments, a data warehouse may assign a franchise identifier to represent a set of merchant identifiers (e.g., 501) that represent the different owners in the franchise.

Figure 11:
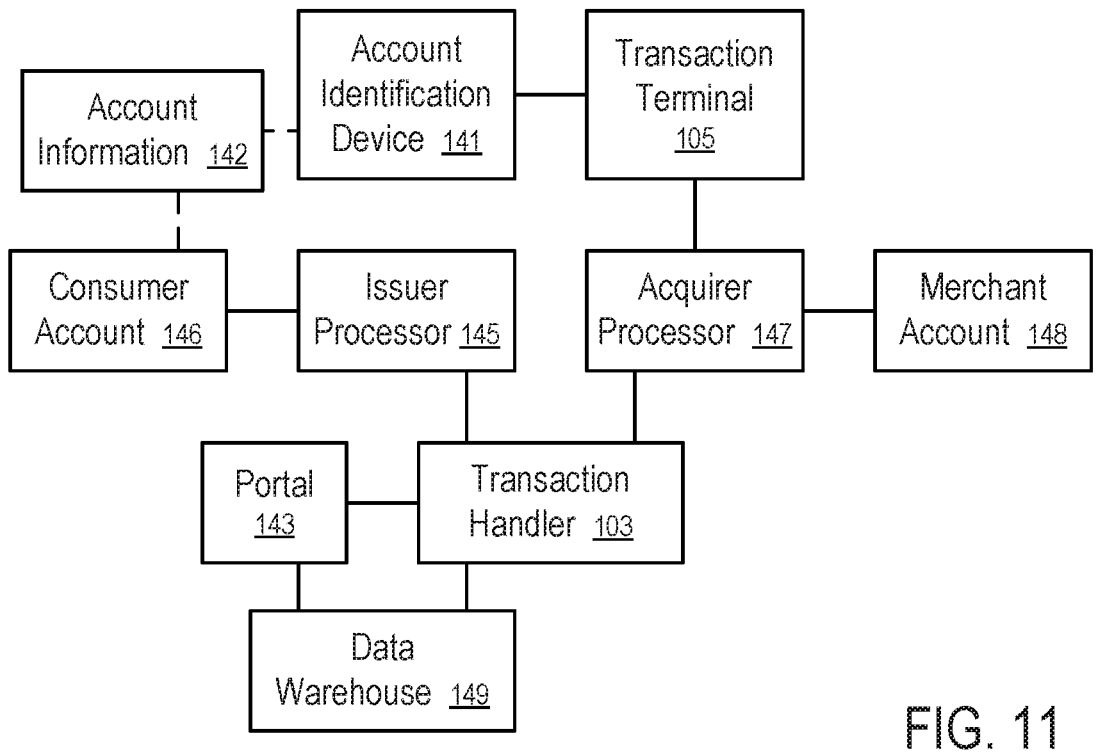
FIG. 11 shows a system to provide information based on transaction data according to one embodiment.

In FIG. 3, the transaction handler (103) is configured to monitor the transaction messages transmitted in the payment processing network (e.g., illustrated in FIG. 11). The transaction handler (103) is configured to save a transaction record (301) for the payment transaction. The transaction record (301) includes fields such as the acquirer bank identification number (512) of the acquirer processor (147) responsible for processing the payment transaction, the card acceptor ID (513) and the terminal ID (514) of the transaction terminal (105) used to initiated the payment transaction and other parameters, such as transaction data and time, transaction amount, merchant category code of the merchant, etc.

In FIG. 3, the portal (143) is configured to receive the communication of a non-processing item, such as the offer (186), outside the communication system of the payment processing network (e.g., not received via the transaction handler (103), the acquirer processor (147), and/or the issuer processor (145)). The offer (186) is configured to include the merchant identifier (501) to indicate that the offer is from the merchant (509) and the store identifier (503) to indicate that the offer (186) is applicable to payment transactions made in the store represented by the store identifier (503).

For example, to determine whether the transaction of the transaction record (301) is relevant to the offer (186), the portal (143) determines whether the transaction processing parameters (512, 513, ... , 514) of the transaction record (301) match with the transaction processing parameters (507) associated with the merchant identifier (501) and/or the store identifier (503).

For example, in one embodiment, after a user (101) accepts the offer (186), a trigger record (207) is configured to detect the transactions made in the consumer payment account (146) of the user (101). When the transaction handler (103) detects the transaction of the user (101) based on the trigger record (207), the transaction handler (103) requests the portal (143) (or a rule engine (519)) to determine whether the transaction having the transaction record (301) is relevant to the offer (186). Based on the merchant identifier (501) and/or the store identifier (503) specified for the offer (186), the portal (143) (or the rule engine (519)) looks up the transaction processing parameters (e.g., 507) that are associated with the merchant identifier (501) and/or the store identifier (503) and determines whether the transaction processing parameters (512, 513, ... , 514) of the transaction record (301) match with the transaction processing parameters (507) associated with the merchant identifier (501) and/or the store identifier (503). If there is a match, the transaction is for the store of the merchant and thus relevant to the offer (186); and otherwise, the transaction is not relevant to the offer (186).

Figure 14:
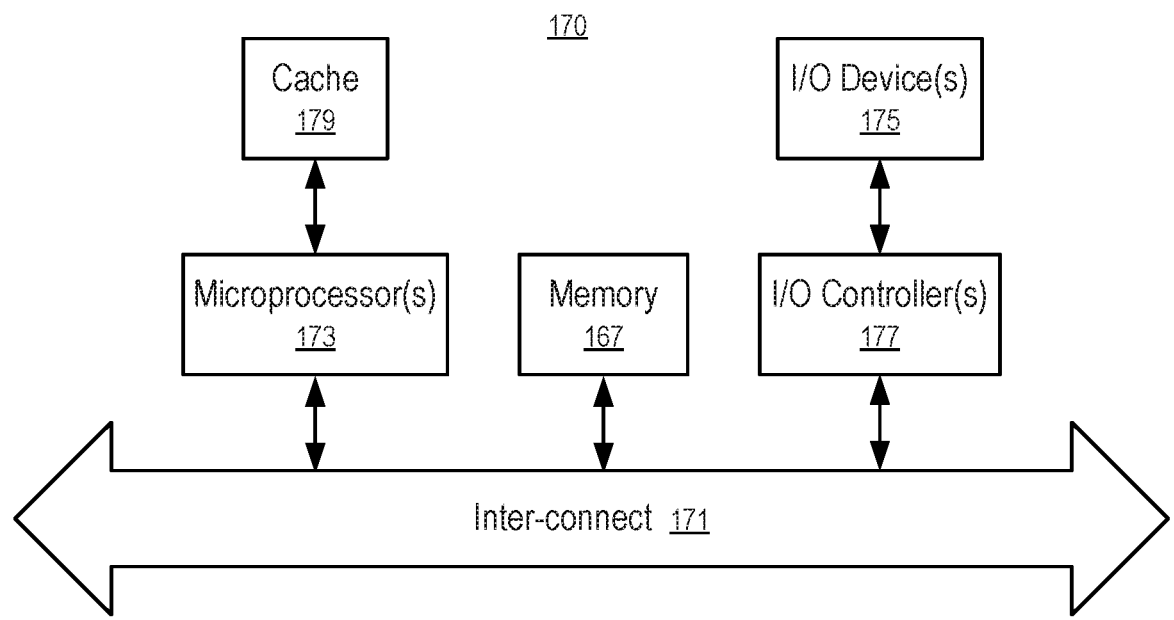
FIG. 14 illustrates a data processing system according to one embodiment.

In one embodiment, a computing apparatus is configured to include one or more of: the portal (143), the data warehouse (149), the message broker (201), the media controller (115), the rule engine (519), and the transaction handler (103), each of which may be implemented via a data processing system illustrated in FIG. 14.

The computing apparatus can be further implemented, optionally, to perform other operations discussed below, such as the operations discussed in the section entitled "TRANSACTION DATA BASED SERVICES." Some of the hardware arrangements are discussed in the sections entitled "CENTRALIZED DATA WAREHOUSE" and "HARDWARE."

In one embodiment, a system is configured to detect changes in transaction parameters for the identification of a merchant and/or a store of the merchant in a payment processing network. The changes may be caused by adjustments in business arrangements and/or payment processing arrangements. For example, the store may be moved to a new location while using the same acquirer and the same set of transaction terminals. For example, the merchant may change the name of the business while operating at the same location and/or use the same acquirer. For example, the merchant may replace certain transaction terminals and/or use a different acquirer. The system is configured to monitor input data, such as acquirer's merchant master file (AMMF), transaction records, to detect transaction parameters of a processing entity that partially match with the transaction parameters associated with an external, persistent identifier of the merchant and/or the store of the merchant, determine a change or difference introduced in the detect transaction parameters, and update the set of transaction parameters associated with the external, persistent identifier accordingly. Further details and examples are provided in the section entitled "UPDATE IDENTIFICATION".

Update Identification

In one embodiment discussed above, an external, persistent identifier is configured to be used outside the communication system of a payment processing network to identify a merchant/store as a processing entity within the communication system of a payment processing network. The identifier is associated with a set of transaction processing parameters that can be used to determine whether or not a transaction is made for the merchant/store.

However, a change in business arrangement or payment processing arrangement may cause one or more changes in the transaction processing parameters of the merchant/store.

In one embodiment discussed in this section, the system is further configured to use recent merchant data and/or transaction data, such as recent transaction records saved by a transaction handler and/or acquirer's merchant master files (AMMF) received from respective acquirers of the merchants, to detect, in an automated way, the changes and update the transaction processing parameters associated with the external, persistent identifier for the identification of the payment transactions of the merchant/store.

For example, a merchant/store may add a new location, close a location, or move from one location to another. Thus, the merchant/store address in the transaction processing parameters may change.

For example, a change in ownership may result in the set of transaction terminals connected to the same acquirer being used by a different merchant.

For example, a change in merchant/store location name may be a result of a change in business arrangement of the merchant/store. For example, merchants may combine via acquisitions/mergers; and additional stores may open under the same merchant.

In one embodiment, the system is configured to automatically keep track of merchant processing characteristics (e.g., acquirer BIN, Card Acceptor ID, terminal ID, and/or other details) and maintain them current by deriving information from multiple data sources, such as global repository for merchant data, transaction data, merchant profile database containing merchant information received from acquirers, such as acquirer's merchant master files.

Through the automatic identification and addition of parameters sets for new stores and/or existing stores, the system allows offers running at a merchant level to be extended automatically to new stores without any manual intervention. Automatic recognition of the merchant location name allows system to make the offer program robust.

The detection of the changes and/or the automated updates in the merchant identification parameters prevent incorrect store identification being used to trigger operations based on transaction messages for authorization or settlement, such as the triggering of automated offer redemption based on an authorization request containing the identification, the triggering of a real time message related to an offer based on an authorization request identifying a transaction of a relevant merchant/store. Further, the detection of the changes allow pro-active identification of data quality issues and prevent stores having potentially incorrect identification data from being added into an offer management system.

In one embodiment, a centralized system is configured to provide the latest, accurate merchant data to stakeholder systems that uses the merchant processing characteristics to identify merchants/stores. The merchant processing characteristics include the transaction processing parameters used in authorization/settlement messages, such as merchant name, merchant address, acquirer BIN, Card Acceptor ID. The system monitors transaction data and acquirer submitted merchant data to detect changes in identification data of a merchant and/or a store. Through matching relevant fields of transaction data and acquirer submitted merchant data of the same merchant/store, alternative expressions for the respective fields are determined. Changes may be detected by the way of the detection of new alternative expressions or the detection of expired expressions that have not been used after more than a pre-determined period of time. The detected changes can be updated automatically and/or sent to merchants for confirmation (e.g., before and/or after the update).

Since the system is capable of automatically identifying certain changes in merchant/store identification information used within the payment processing system, the system can improve the accuracy of the merchant/store identification information for various services, allowing such services to rely upon payment transaction messages transmitted within the payment processing network to determine whether the payment transactions are for the merchants/stores identified by respective external, persistent identifiers, such as transaction-based add-on services that are dependent on the merchant location and/or merchant identity at the store level.

In general, many changes to business arrangements and/or payment arrangements of merchants and/or their stores can cause a partial change in merchant processing characteristics/transaction processing parameters usable to identify merchants/stores in messages transmitted within a payment processing network. Such partial changes may be caused by mergers and acquisitions, addition of a store under the same merchant, change of store name, change of store location, change in POS terminal ownership, etc. In a partial change, a changed set of processing characteristics/transaction processing parameters can be matched with the known processing characteristics/transaction processing parameters to conclude that, with a degree of certainty, the changed set of processing characteristics/transaction processing parameters is for the corresponding merchant/store. Thus, the change can be identified and applied to the set of characteristics/transaction processing parameters of the merchant/store in an automated way.

Figure 4:
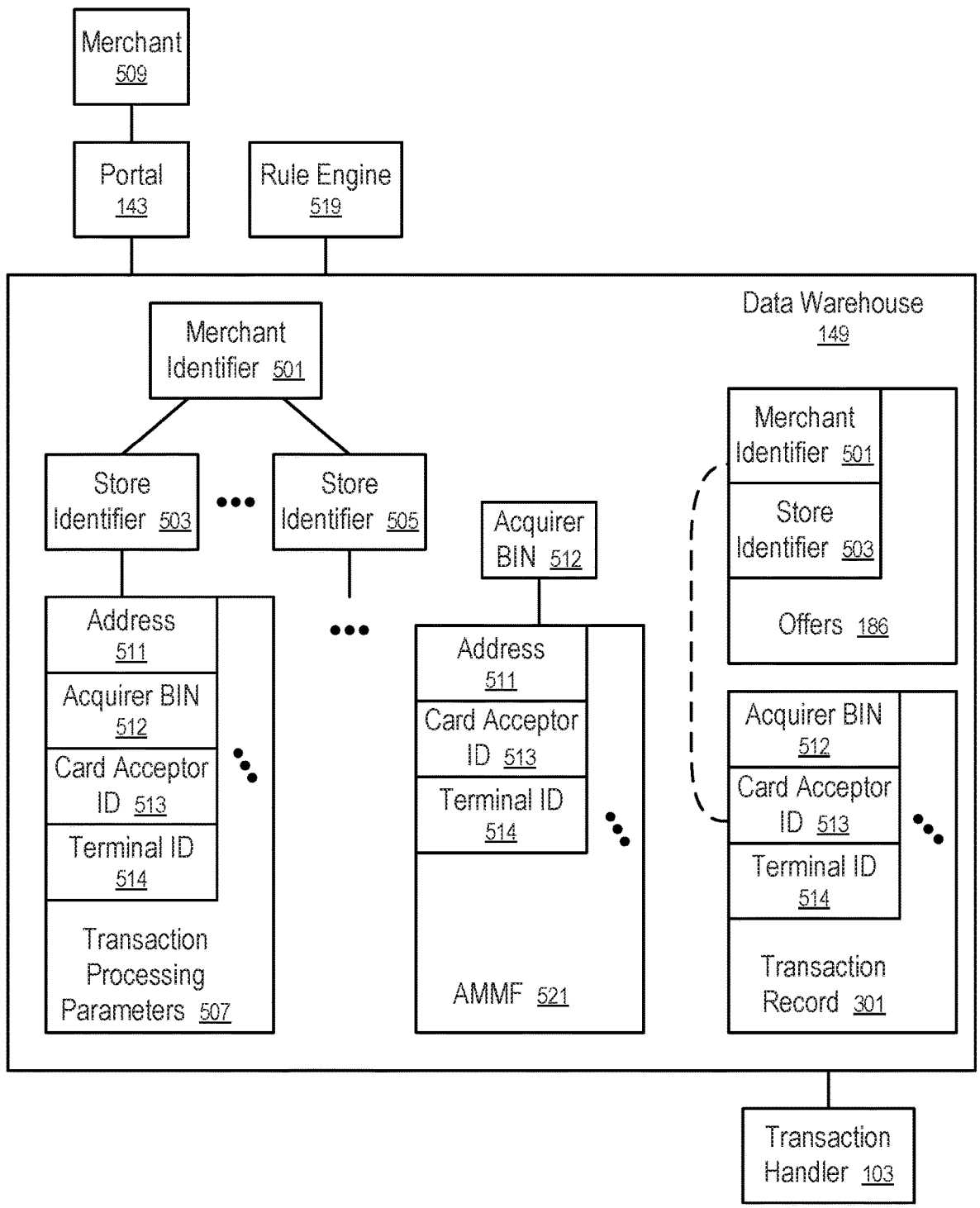
FIG. 4 shows a system configured to update merchant identification information according to one embodiment.

FIG. 4 shows a system configured to update merchant identification information according to one embodiment.

In FIG. 4, the data warehouse (149) is configured to store a set of transaction processing parameters (507) of a merchant/store, such as an address (511) and/or a name of the merchant/store from an acquirer's merchant master file (AMMF) or a transaction message for authorization and/or settlement, a bank identification number (BIN) of an acquirer of the merchant/store, one or more card acceptor IDs (513) assigned by the acquirer to the merchant/store, one or more terminal IDs of transaction terminals (e.g., 105) of the store identified by the store identifier (503).

For example, the transaction processing parameters (507) can be initially identified via a user interface illustrated in FIG. 14 and discussed in section entitled "STORE IDENTIFICATION", and subsequently updated via the system described in this section.

In one embodiment, for each of the data fields, such as address (511), acquirer BIN (512), card acceptor ID (513), terminal ID (514), the transaction processing parameters (507) includes one or more alternative expressions. For example, the store identifier (503) may have a plurality of alternative expressions for the data field of card acceptor ID (513), where each of the alternative expressions is a valid match for the data field of card acceptor ID (513) in a transaction communication message for the store identified by the store identifier (503).

In one embodiment, a complete match between a transaction message and the transaction processing parameters (507) of the store identifier (503) occurs when the transaction message having a correct matching alternative expression for each of the data fields (511, ..., 514) in the transaction processing parameters (507). A partial between a transaction message and the transaction processing parameters (507) of the store identifier (503) occurs when the transaction message having a correct matching alternative expression for some but not all of the data fields (511, ..., 514) in the transaction processing parameters (507).

In one embodiment, the portal (143) is configured to receive an acquirer's merchant master file (AMMF) (521) periodically from an acquirer identified by the acquirer BIN (512). The AMMF (521) includes a profile of a merchant, including information such as the address (511) of the merchant as known to the acquirer, one or more Card Acceptor IDs (e.g., 513) of the merchant/store, one or more terminal IDs (514) of the merchant/store, and other information about the store/merchant, such as a name of the store/merchant.

Similar to the matching between a transaction message and the transaction processing parameters (507) associated with the store identifier (503), the AMMF (521) data for a store/merchant associated with the acquirer BIN (512) can be a complete match or a partial match of the transaction processing parameters (507).

In FIG. 4, the rule engine (519) is configured to match the merchant profile in the AMMF (521) with the set of transaction processing parameters (507) of the store identifier (503).

For example, when the acquirer BIN (512) of the AMMF (521) matches with the acquirer BIN (512) in transaction processing parameters (507) of the store identifier (503), the address (511) in AMMF (521) matches with the address (511) of the store identifier (503), and the card acceptor ID (513) in AMMF (521) matches with a card acceptor ID (513) of the store identifier (503), the merchant profile in the AMMF (521) can be considered as a profile providing information for the store identifier (503). When a terminal ID (514) in the merchant profile does not match any of the terminal ID (514) in the transaction processing parameters (507) of the store identifier (503), the terminal ID (514) can be added to the transaction processing parameters (507) as an alternative expression for terminal ID (514) of the store identifier (503). The addition may be the result of adding a new transaction terminal (105) in the store of the merchant, or replacing an old transaction terminal with a new transaction terminal (105) in the store of the merchant.

Similarly, when a store of a merchant is moved from one address to another, the AMMF (521) may indicate that the address (511) is the set of card acceptor ID (513) and/or the terminal ID (514) has been changed in comparison with the transaction processing parameters (507). The new address provided in the AMMF (521) (or in a transaction record (301)) can be added as an alternative expression for the address (511) of the store identifier (503).

Thus, incremental changes in some of the transaction processing parameters (507) can be detected with great certainty and updated automatically in real time with the changes. For example, the rule engine (519) is configured in one embodiment to detect the relocation of a transaction terminal from one store to another, in response to a determination that the terminal ID (514) previously associated with an address (511) is now associated with another address.

The transaction processing parameters (507) may include other parameters not shown in FIG. 4, such as merchant/store names as known to the acquirer, reported in the AMMF (521) or the transaction record (301).

In one embodiment, the portal (143) and/or the rule engine (519) is configured to match the parameters in the transaction records (e.g., 301) with those in the transaction processing parameters (507) of the store identifier (503) to detect changes. For example, when the terminal ID (514) of the transaction record (301) matches with the terminal ID (514) of the store identifier (503), but the acquirer BIN (512) of the transaction record (301) does not match with the acquirer BIN (512) in the transaction processing parameter (507) of the store identifier (503), it can be considered as an indication of a change of acquirer services for the merchant. The rule engine (519) may add the acquirer BIN (512) found in the transaction record (301) in the set of transaction processing parameters (507) of the store identifier (503) and optionally remove the old acquirer BIN (512) from the set of transaction processing parameters (507) of the store identifier (503).

In one embodiment, the portal (143) and/or the rule engine (519) is further configured to track the usage of the transaction processing parameters (507) in the recent AMMF (521) and the recent transaction records (e.g., 301). If a parameter in the set of transaction processing parameters (507) associated with the store identifier (503) has not been used in payment transactions for a period of time and not reported in an AMMF (521) for one or more reporting cycles for submitting AMMFs, the parameter may be removed from the set of transaction processing parameters (507) associated with the store identifier (503).

For example, the rule engine (519) can remove an old acquirer BIN (512) from the set of transaction processing parameters (507) of the store identifier (503) after it is determined that no AMMF having the old acquirer BIN (512) has reported a merchant profile containing the parameters of the corresponding transaction terminals of the store identifier (503), and the old acquirer BIN (512) has not been used in the transactions reported by the transaction records (e.g., 301) of transactions initiated at the corresponding transaction terminals of the store identifier (503).

Figure 5:
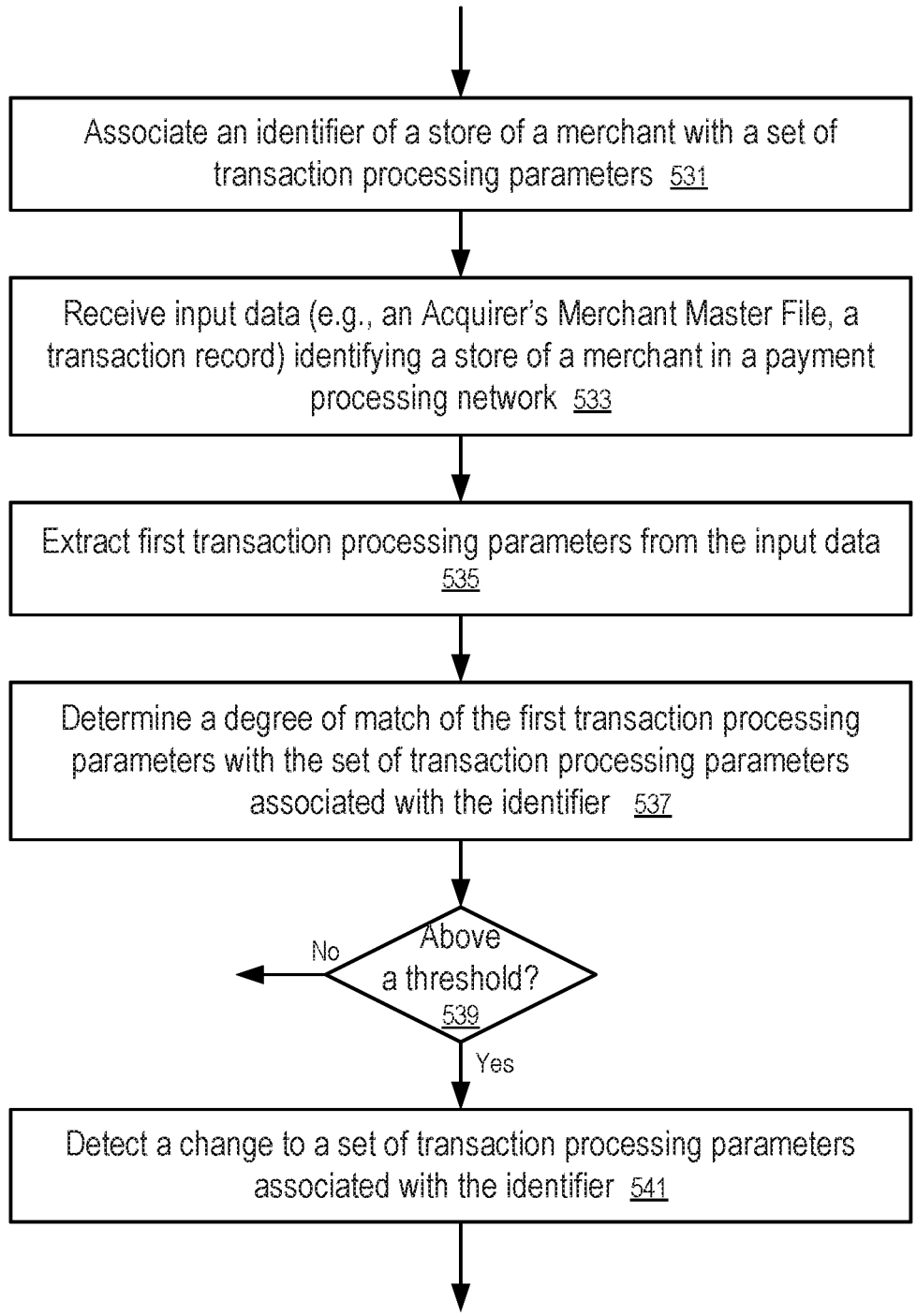
FIG. 5 shows a method configured to update merchant identification information according to one embodiment.

FIG. 5 shows a method configured to update merchant identification information according to one embodiment. For example, the method of FIG. 5 can be implemented in a system illustrated in FIG. 4.

In one embodiment, a computing apparatus is configured to associate (531) an identifier (503) of a store of a merchant with a set of transaction processing parameters (507); receive (533) input data (e.g., an Acquirer's Merchant Master File (AMMF) (521), a transaction record (301)) identifying a store of a merchant in a payment processing network; extract (535) first transaction processing parameters from the input data; determine (537) a degree of match of the first transaction processing parameters with the set of transaction processing parameters (507) associated with the identifier; if the degree of match is determined (539) to be above a threshold, detect (541) a change to a set of transaction processing parameters (507) associated with the identifier (541). The detect change can be applied to the set of transaction processing parameters (507) associated with the identifier (541) automatically, or after a notification to the merchant is confirmed.

Figure 7:
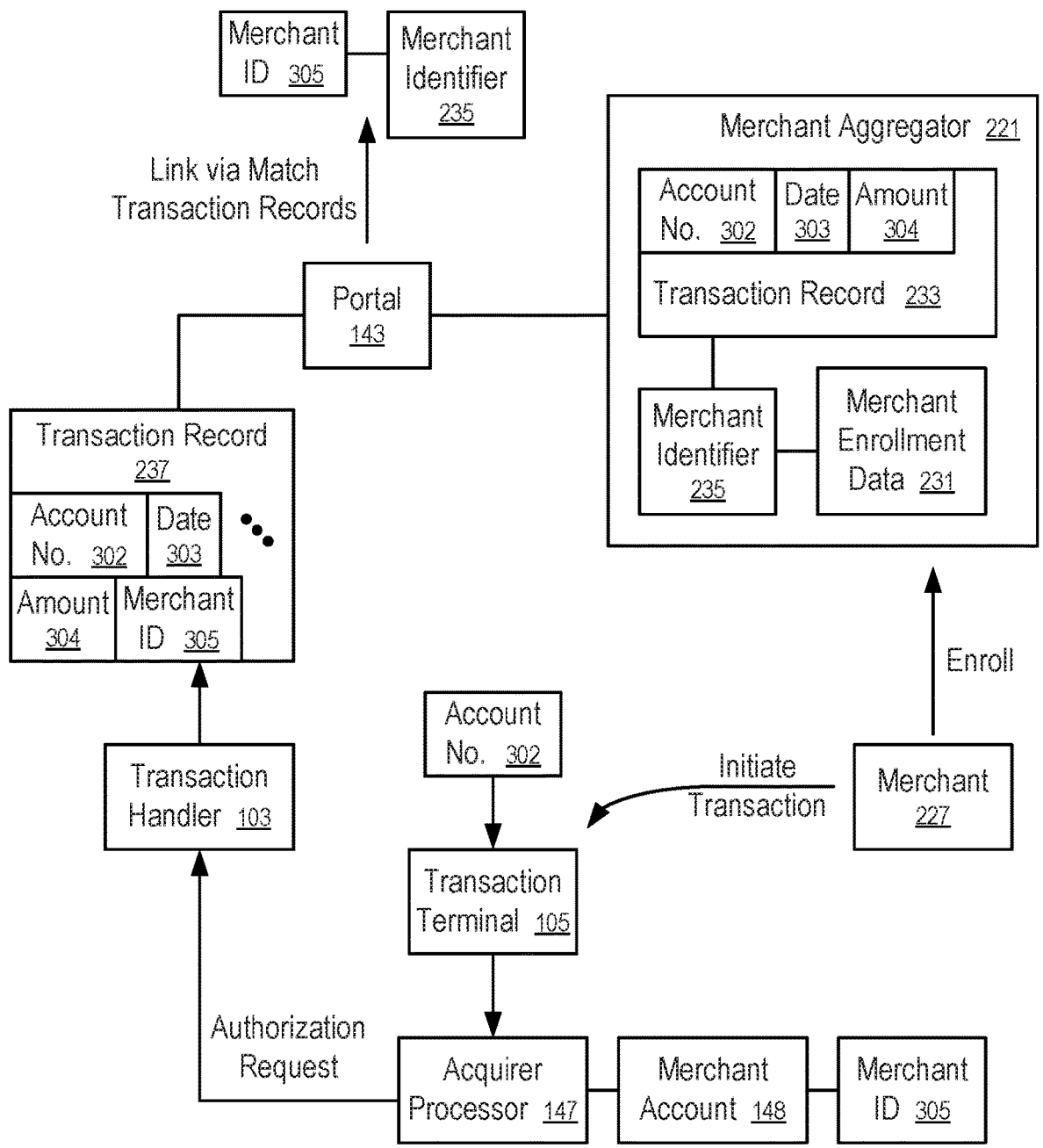
FIG. 7 shows a system to enroll a merchant according to one embodiment.

In one embodiment, the computing apparatus is configured to include one or more of: the portal (143), the data warehouse (149), the message broker (201), the media controller (115), the rule engine (519), and the transaction handler (103), each of which may be implemented via a data processing system illustrated in FIG. 7.

For example, the computing apparatus of one embodiment includes a transaction handler (103) having at least one microprocessor (173) and a memory (167, 179) storing first instructions configured to instruct the microprocessor to process authorization of transactions in an electronic payment transaction processing network illustrated in FIG. 11.

The computing apparatus further includes a data warehouse (149) having at least one data storage device to store transaction records (301) of the authorization of the transactions processed by the transaction handler (103), where each of the transaction records (301) includes data fields identifying merchants and transaction terminals of the merchants, such as data fields for acquirer BIN (512), card acceptor ID (513), terminal ID (514), merchant name, merchant address, etc.

The computing apparatus further includes a portal (143) coupled with the data warehouse (149) and having at least one microprocessor (173) and a memory (167, 179) storing second instructions configured to instruct the portal (143) to receive acquirer submitted merchant data, such as AMMF (521), and access the transaction records (301) generated by the transaction handler (103).

The computing apparatus further includes a rule engine (519) having at least one microprocessor (167) and a memory (167, 179) storing third instructions configured to instruct the rule engine (519) to: store identification data (503, 507) associating an identifier (503) uniquely identify a store of a merchant and alternative expressions (e.g., 507) of merchant attributes obtained from the data fields of transaction records (301) of the store of the merchant and/or the AMMF (521). The alternative expressions of the merchant attributes identify one or more transaction terminals disposed in the store of the merchant.

In one embodiment, the merchant is identified using a merchant identifier (501); and the stores of the merchant are individually represented by the store identifiers (503, . . . , 505).

For example, when the respective data fields (512-514) of the transaction record (301) of a payment transaction matches with the respective alternative expressions in the transaction processing parameters (507) associated with the store identifier (503), the transaction can be determined as a transaction for the store identified by the identifier (503).

The rule engine (519) is further configured via the third instructions to: determine a partial match between the alternative expressions (e.g., 507) of the merchant attributes (511-514) associated with the identifier (503) and merchant data received within the electronic payment transaction processing network after the identification data is stored, such as the transaction record (301) and/or the AMMF (521). In response to the partial match, the rule engine (519) is further configured via the third instructions to identify a mismatched merchant attribute according to the partial match; and update the identification data (e.g., 507) according to the mismatched merchant attribute.

In one embodiment, the partial match is determined when a first transaction terminal identified in the first merchant data has a first set of expressions agreeing with the alternative expressions of a first subset of the merchant attributes, and a second set of expressions not found in the alternative expressions of a second subset of the merchant attributes.

In one embodiment, the rule engine is configured via the third instructions to identify additional alternative expressions of the second subset of the merchant attributes representing the first transaction terminal disposed in the store of the merchant.

In one embodiment, the rule engine is configured via the third instructions to detect alternative expressions of the merchant attributes that have not been used in transactions initiated on one or more transaction terminals disposed in the store of the merchant for a predetermined period of time.

In identifying the mismatched merchant attribute, the rule engine is further configured via the third instructions to identify one or more additional alternative expressions. The identification data (507) is updated to include the one or more additional alternative expressions determined for the mismatched merchant attribute.

In one embodiment, the rule engine is further configured via the third instructions to determine a probability that the one or more additional alternative expressions are for the store of the merchant; and a human operator is prompted to investigate the mismatched merchant attribute when the probability is below a threshold. For example, the probability can be evaluated based at least in part on a degree of mismatching between the existing alternative expressions of the merchant attributes associated with the identifier and the merchant data received within the electronic payment transaction processing network, such as the transaction record (301) and/or the AMMF (521).

In one embodiment, the identification data (e.g., 507) includes a set of alternative expressions for the mismatched merchant attribute; and each expression in the set of alternative expressions is a match candidate for the mismatched merchant attribute. When the merchant data received within the electronic payment transaction processing network identifies a transaction terminal with expressions consistent with the alternative expression for matched merchant attribute for the store identifier (503), but none of the set of alternative expressions for the mismatched merchant attribute, the received merchant data identifies one or more additional alternative expressions for the mismatched merchant attribute.

In one embodiment, the rule engine is further configured via the third instructions to: identify one or more alternative expressions in the set of alternative expressions that have not been used in transactions of the store of the merchant within a period of time; and update the set of alternative expressions to exclude the one or more alternative expressions. For example, the rule engine is configured in one embodiment to: determine a probability that the one or more alternative expressions have been eliminated for the store of the merchant; and prompt a human operator to investigate elimination of the one or more alternative expressions when probability is below a threshold.

The computing apparatus can be further implemented, optionally, to perform other operations discussed below, such as the operations discussed in the section entitled "TRANSACTION DATA BASED SERVICES." Some of the hardware arrangements are discussed in the sections entitled "CENTRALIZED DATA WAREHOUSE" and "HARDWARE."

Merchant Aggregator

In one embodiment, real-time information about transactions is communicated to a remote computing device, such as a merchant aggregator, which has a plurality of merchants as clients. The computing device is connected to the portal (143) of the transaction handler (103) a communication network (e.g., Internet, a wide area network, or a dedicate network) to receive the real-time information and provide services to the merchants and their customers.

In one embodiment, the remote computing device, such as the merchant aggregator, is configured to provide offers (186) to customers (e.g., user (101)) on behalf of the merchants, service loyalty programs on behalf of the merchants, and/or provide rewards to customers (e.g., user (101)) for their interaction with the merchants, etc. The real-time information about the transactions between the merchants and the customers allows the remote computing device to provide new services and improve existing services.

In one embodiment, the computing device remotely connected to the portal (143), such as a merchant aggregator, is configured to enroll merchants and/or customers (e.g., user (101)) to provide services based on the real-time information about transactions between the merchants and the customers (e.g., user (101)). However, the identifiers used by the portal (143) to identify the enrolled merchants are generally different from merchant identifies used by the transaction handler (103) in processing transactions initiated using the transaction terminals (e.g., 105) of the merchants. Thus, the identifiers used by the portal (143) to identify the enrolled merchants may not be sufficient to identify the transactions between the enrolled merchants and the enrolled customers.

In one embodiment, the portal (143) of the transaction handler (103) is configured to match the identities of the merchants as known to the remote computing device, such as the merchant aggregator, with the identities of the merchants as known to the transaction handler (103), to facilitate the monitoring of transactions of the merchants and to generate the real-time information about the transactions between the respective merchants and enrolled customers (e.g., user (101)).

In one embodiment, the portal (143) is configured to link a merchant identifier of a merchant as known to the remote computing device to a merchant identifier of the merchant as known to the transaction handler (103) via a transaction made using a transaction terminal (105) of the merchant. Information about the transaction is communicated between the portal (143) and the remote computing device, in association with the merchant identifier of the merchant as known to the remote computing device, to identify the transaction from the transactions processed the transaction handler (103) and thus link the merchant identifier of the merchant as known to the remote computing device, to the merchant identifier used in the identified transaction.

Alternatively or in combination, the portal (143) is configured to link the merchant identifier of the merchant as known to the remote computing device to the merchant identifier of the merchant as known to the transaction handler (103) based at least in part on marching attributes of the merchant, such as name, address, business category, etc.

For example, when a merchant enrolls or registers with the remote computing device to receive the services of the remote computing device, the remote computing device is configured to collect information about the merchant, such as the business name of the merchant, the street address of the merchant, the business category of the merchant, etc. Such information about the merchant can be matched with the respective merchant information in the data warehouse stored for the merchants as known to the transaction handler (103). Different data fields, such as name, address, business field, may provide partial match for a given merchant identifier of the merchant as known to the remote computing device; and a rule engine is configured in one embodiment to rank the degree of match and select one or more top ranked candidate merchant identifiers, as used in transactions processed by the transaction handler (103).

In one embodiment, a transaction is initiated on a transaction terminal (105) of a merchant as part of the process to register or enroll the merchant for the services of the remote computing device. The transaction is identified as part of information about the merchant, in association with the merchant identifier of the merchant as known to the remote computing device. The merchant identifier used in the transaction is thus linked to the merchant identifier of the merchant as known to the remote computing device. Thus, transactions of the merchant can be monitored using the merchant identifier used in the transaction formed as part of the process to register or enroll the merchant.

In one embodiment, the transaction formed as part of the process to register or enroll the merchant is performed in a predetermined account. The information about the transaction is provided to the portal (143) to allow the portal (143) to identify a transaction record for the transaction, based on attributes such as the date and/or time of the transaction, the transaction amount, an authorization code for the transaction, and a message (e.g., a pseudo-promotional code) transmitted to the transaction handler (103) in an authorization request for the transaction, etc. The portal (143) is configured to identify the transaction record (e.g., 301) of the transaction based on matching the attributes as identified in the information transmitted from the remote computing device to the portal (143).

In one embodiment, the portal (143) is configured to communicate with the remote computing device to determine one or more parameters of the transaction performed on the transaction terminal (105) of a merchant to enroll or register the merchant. Examples of the parameters that can be configured to uniquely identify merchants to be enrolled include transaction amounts, pseudo-promotional code, etc. After one or more parameters are determined to uniquely identify the merchant among a set of merchants currently in the process of being enrolled or registered, the transaction terminal (105) is used to initiate the transaction according to the one or more parameters; and the transaction handler (103) is configured to monitor transactions being processed to detect the transaction initiate the transaction according to the one or more parameters. In response to the detection of authorization request initiated on the transaction terminal (105) of the merchant for the transaction made according to the one or more parameters, the merchant identifier used in the authorization request is extracted and linked to the merchant as registered and/or enrolled.

In one embodiment, enrollment communication between the portal (143) and the remote computing device includes not only the identification information about the merchant, but also the identification information of the transaction terminal (105) used to initiate the transaction designed to register the merchant and/or the transaction terminal (105). In one embodiment, information about the transaction terminal (105) includes an identifier of the transaction terminal (105) (e.g., a serial number), a location of the transaction terminal (105) (e.g., a street address of a retail store in which the transaction terminal (105) is deployed, a GPS position of the transaction terminal (105), a description of the location of the transaction terminal (105) within a retail store in which a plurality of transaction terminals (e.g., 105) of the merchant are located).

In one embodiment, multiple transactions are performed to individually identify the transaction terminals of the merchant. Thus, the transaction handler (103) can monitor the transactions made using specific transaction terminals of the merchant and/or provide information about the transaction terminals on which the monitored transactions are initiated.

In one embodiment, when an authorization request for a transaction made using the one or more parameters assigned to uniquely identify the merchant and/or the transaction terminal (105) of the merchant is detected, the transaction handler (103) is configured to communicate with the portal (143) to provide a response to indicate the detection of the transaction. For example, in one embodiment, the transaction handler (103) is configured to provide an indication via the authorization response to indicate the recognition of the merchant and/or the transaction terminal (105). For example, in one embodiment, the portal (143) is configured to provide a message to the remote computing device to indicate the successful detection of transaction associated with the merchant and/or the transaction terminal (105) and completion of the registration or enrollment process.

Figure 6:
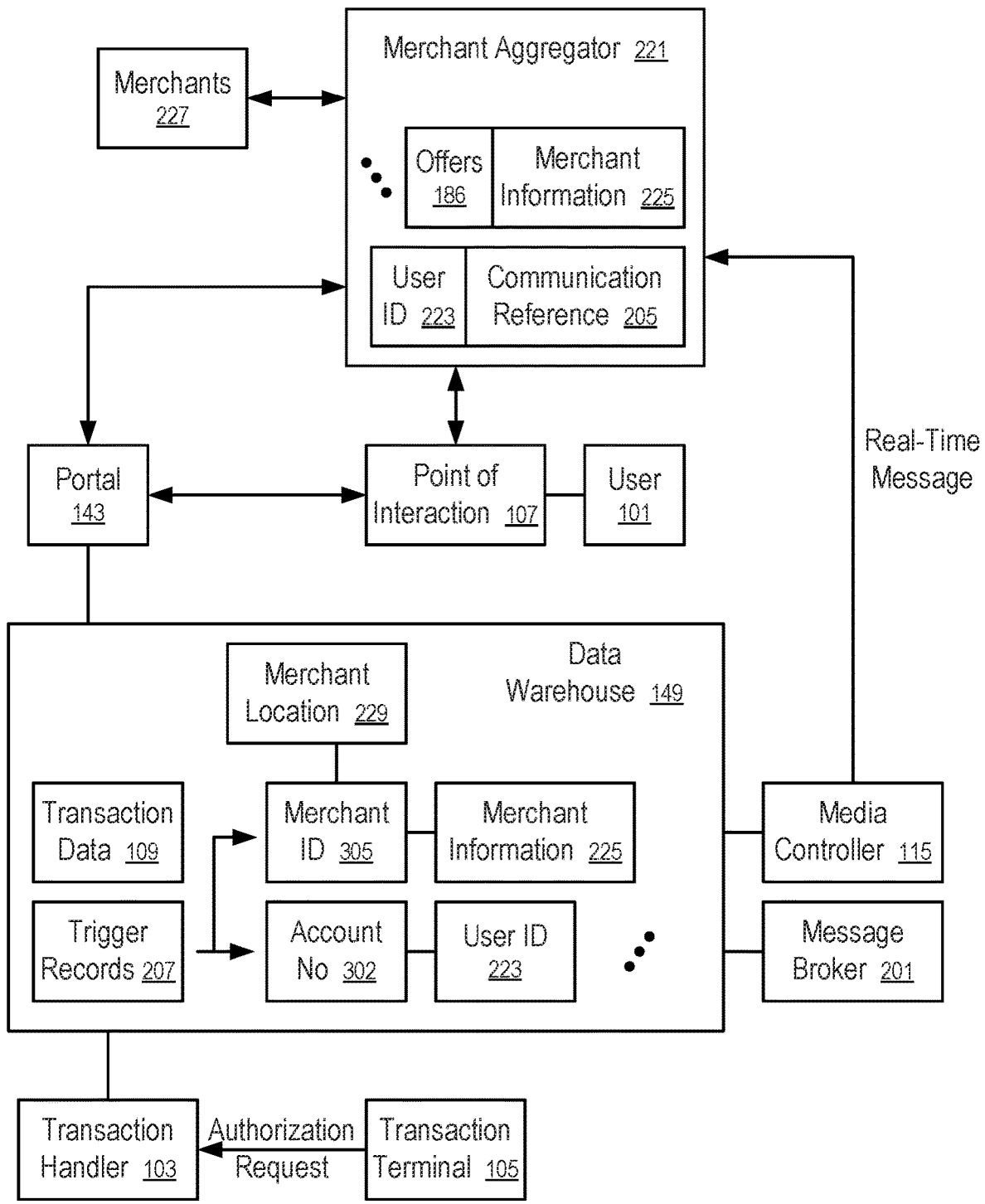
FIG. 6 shows a system configured to communicate via a merchant aggregator according to one embodiment.

FIG. 6 shows a system configured to communicate via a merchant aggregator according to one embodiment. In FIG. 6, the merchant aggregator (221) is configured to communicate with merchants (227) to enroll the merchants (227) for the services of the system.

In one embodiment, when the merchant aggregator (221) enrolls a new merchant, the merchant aggregator provides merchant information (225) to the portal (143) of the transaction handler (103) to request the portal (143) and/or the transaction handler (103) to monitor the transactions of the respective merchant (227).

In one embodiment, the merchant information (225) used by the merchant aggregator (221) to identify the merchant (227) may include the business data (e.g., corporation data, corporation name, consumer-facing name, "doing business as" names, names of affiliates and/or subsidiaries), addresses and store locations, etc. of the merchant (227). In one embodiment, the merchant information (225) further includes information about the acquirer representing the merchant, merchant category, and/or other relevant information that is helpful in identifying the merchant in the transaction processing network having the transaction handler (103) interconnecting acquirer processors (e.g., 147) operated by acquirers representing respective merchants and issuer processors (e.g., 145) operated by issuers representing respective users (101) of consumer accounts (146).

For example, in one embodiment, the merchant aggregator (221) provides the merchant information (225) via a spreadsheet identifying a list of merchants (227). In the spreadsheet, each merchant (227) is identified via the corporate name of the merchant (227) and the consumer-facing name of the merchant. For less well known merchants (e.g., small businesses), the spreadsheet further identifies the name of the acquiring bank that represents the merchant (227) in processing transactions to be processed via the transaction handler (103). In one embodiment, the spreadsheet further includes the desired starting date of monitoring the transactions of the merchants (227) identified in the spreadsheet and the expected ending date of monitoring the transactions of the merchant (227) for the merchant aggregator (221).

Figure 9:
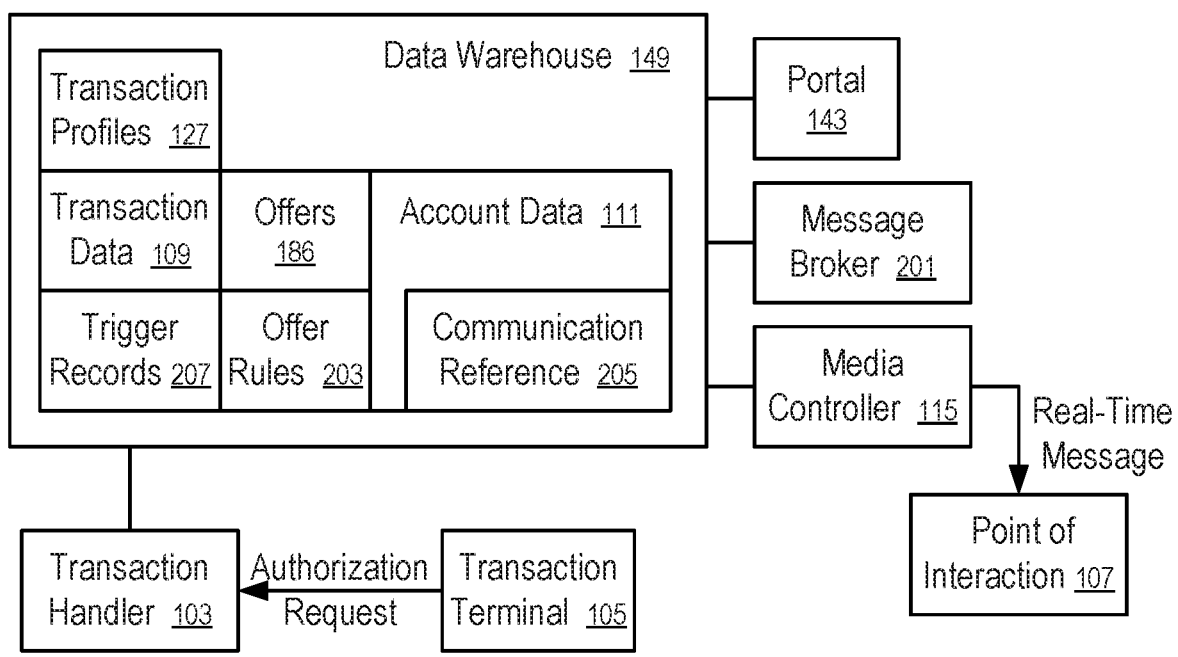
FIG. 9 shows a system to provide real-time messages according to one embodiment.

In one embodiment, the portal (143) is configured to provide a user interface that allows the merchant aggregator (221) to specify data for the creation of the trigger records (207) associated with an offer campaign. For example, the user interface in one embodiment allows the merchant aggregator (221) to create an offer campaign associated with one of the merchants (227) identified in the spreadsheet provided to identify the merchants (227). To support the offer campaign, the user interface is configured to allow the merchant aggregator (221) to specify rules to monitor the transactions of the respect merchant (227). For example, the rules may identify a date to start testing of the monitoring of the transactions of the merchant (227), a date to send the monitoring of the transactions of the merchant (227) for the purpose of the offer campaign, a request for a notification of transactions provided in real time as the processing of the authorization requests of the respective transactions of the merchant (227), and/or a request for a notification of transactions provided in real time as the processing of the settlement requests of the respective transactions of the merchant (227). In one embodiment, the user interface further allows the merchant aggregator (221) to specify other requirements to select transactions to be monitored, such as requirements based on transaction amount, transaction time, characteristics of the user (101) purchasing from the merchant (227), etc. In one embodiment, the user interface further allows the merchant aggregator (221) to specify messages to be transmitted, in a way as illustrated in FIG. 9, to the respective user (101) transacting with the merchant (227), in response to the transactions detected according to the offer rules.

In one embodiment, the portal (143) is configured to correctly identify transactions associated with the enrolled merchant (227) based on the merchant information (225), and calculate the location of the transactions to enable location based services associated with the offer (186) of the merchant (227).

In one embodiment, based on the merchant information (225), the portal (143) is configured to identify one or more merchant IDs (305) that are configured to be used in authorization requests for transactions of the merchant (227) identified by the merchant information (225). The identified merchant ID (305) is used to generate the trigger records (207) for monitoring the transactions of the merchant (227) identified by the merchant information (225) provided by the merchant aggregator (221).

In one embodiment, the account holders (e.g., user (101)) are required to enroll with the system to provide the consent for the media controller (115) to send the transaction information of the account holders (e.g., user (101)) to the merchant aggregator (221), and for the media controller (115) and/or the merchant aggregator (221) to send messages to the point of interaction (107) of the user (101) based on the transaction information.

In FIG. 6, after user enrollment, the user (101) of the consumer account (146) is identified to be associated with a user ID (223) used by the merchant aggregator (221) to identify the user (101). The user (101) may further provide the communication reference (205) to the merchant aggregator (221) to receive offers (186), rewards, notifications, alerts, etc. The transaction handler (103) is configured to use the trigger records (207) containing the account number (302) of the user (101) to detect the transactions of the user (101) (e.g., the transactions between the user (101) between one or more the enrolled merchants (e.g., 227)).

To associate the account number (302) with the user ID (223) in one embodiment, the account number (302) of the consumer account (146) of the user (101) is identified to the portal (143) during the user enrollment and stored in the data warehouse (149) in association with the user ID (223).

For example, during the user enrollment process, the point of interaction (107) (e.g., a web browser, a mobile phone) of the user (101) interacting with the merchant aggregator (221) is redirected in one embodiment from the merchant aggregator (221) to the portal (143) with a reference to the user ID (223); and in response, the portal (143) provides a user interface to the point of interaction (107) of the user (101) to specify the account number (302). After the account number (302) specified by the user (101) is validated and/or authenticated (e.g., via security code, person identification number, security questions, security devices, etc.), the account number (302) is associated with the user ID (223) in the data warehouse (149) of the transaction handler (103).

In one embodiment, more than one account number (302) of the consumer accounts (146) of the user (101) can be associated with the single user ID (223) used by the merchant aggregator (221) to represent the user (101).

In one embodiment, the user ID (223) is assigned to the user (101) by the merchant aggregator (221) during the enrollment process. Alternatively, the portal (143) may generate and assign the user ID (223) for the user during the enrollment process and provide the user ID (223) to the merchant aggregator (221) to complete the enrollment of the user (101).

In one embodiment, during the enrollment process, the user (101) provides the account number (302) to the merchant aggregator (221), which indicates the association between the account number (302) and the user ID (223) to the portal (143) of the transaction handler (103); and the user ID (223) is subsequently used to identify the user (101) is messages to the merchant aggregator (221). Alternatively, the account number (302) may be used directly to identify the user (101), when the real-time message from the media controller (115) to the merchant aggregator (221) is transmitted over a secure communication channel.

In one embodiment, the trigger record (207) is generated based at least in part on the account number (302) and the merchant ID (305) to monitor the transactions between the user (101) and the merchant (227). When the authorization request from the transaction terminal (105) of the merchant (227) identifies the account number (302) and the merchant ID (305), as required by the trigger record (207) (and satisfies other requirements of the trigger record (207), such as requirements related to the date and time of the transaction, the amount of the transaction, etc.), the transaction handler (103) causes the message broker (201) to generate a message and transmit the message to the merchant aggregator (221), in real time with the processing of the transaction, to inform the merchant aggregator (221) of the transaction.

In one embodiment, the data warehouse (149) stores the merchant location (229) for the merchant ID (305) associated with the transaction terminal (105).

In one embodiment, in response to the authorization request from the transaction terminal (105), the merchant location (229) of the transaction terminal (105) is determined and included in the real-time message generated by the message broker (201) and provided to the merchant aggregator (221) in a generic, machine-readable format (e.g., XML). Based on the information provided in the real-time message, the merchant aggregator (221) may use the communication reference (205) to communicate offers (186), rewards, messages, notifications, alerts, etc. to the point of interaction (107) of the user (101), such as via messages to a mobile phone identified by the communication reference (205) and/or a mobile application running on the mobile phone of the user (101).

In FIG. 6, the merchant aggregator (221) is configured to communicate with the point of interaction (107) of the user (101) in response to the real-time message from the media controller (115). Alternatively or in combination, the data warehouse (149) may store the communication reference (205), which is used by the media controller (115) to provide one or more separate real-time messages related to location-based offers (186) to the point of interaction (107) of the user (101) without going through the merchant aggregator (221).

In one embodiment, a merchant (227) may have a number of subsidiaries with different names and locations. In response to the merchant information (225), merchant data related to merchant accounts (148) are searched to identify a set of possible matches to the merchant information (225), which may be further communicated to the merchant aggregator (221) for confirmation. For example, in one embodiment, each matched merchant ID is augmented with the respective address of the transaction terminals operated by the respective merchant entity; and the merchant (227) may further confirm the enrollment of the respective merchant entity. In one embodiment, the names and addresses of the merchant information (225) are matched with the names and addresses of the merchant data for merchant accounts (148) to identify the merchant entity that is enrolled via the merchant information (225).

In one embodiment, a plurality of merchant IDs (305) may match the merchant information (225) specified by the merchant aggregator (221); and one or more merchant locations corresponding to the locations of the transaction terminals (105) may associate with a merchant ID (305) in the data warehouse (149). When the trigger record (207) matches a transaction, the merchant location (229) corresponding to the transaction terminal (105) from which the authorization request is received is used for the location-based service provided by the merchant aggregator (221) and/or the message broker (201).

FIG. 7 shows a system to enroll a merchant according to one embodiment. In FIG. 7, a transaction made using a predetermined account number (302) is used to correlate the merchant information (225) (e.g., a merchant identifier (235) of the merchant as known to the merchant aggregator (221)) with the merchant ID (305) used in the transaction messages processed by the transaction handler (103).

In FIG. 7, when the merchant (227) enrolls with the merchant aggregator (221), the merchant enrollment data (231), including the merchant information (225), is generated to identify the names and locations of the enrolled merchant (227). The merchant aggregator (221) uses the merchant identifier (235) to represent the enrolled merchant (227).

In one embodiment, to correlate the merchant identifier (235) with a merchant ID (305) associated with the merchant account (148), the transaction terminal (105) at the enrolled location of the merchant (227) is used to initiate a transaction using a predetermined account number (302). After the transaction is initiated, the acquirer processor (147) connected to the transaction terminal (105) provides the authorization request to the transaction handler (103), which stores the transaction record (237) that includes the predetermined account number (302), the merchant ID (305), the date (303) of the transaction, the amount (304) of the transaction, the authorization code provided by the transaction handler (103), through the acquirer processor (147), to the transaction terminal (105) for the transaction, etc.

In one embodiment, the merchant aggregator (221) stores a separate transaction record (233) including certain information about the transaction as identified by the enrolling merchant (227), such as the predetermined account number (302), the date (303) (or the time period in which transaction is performed), the amount (304), and the authorization code received by the transaction terminal (105), through the acquirer processor (147) and the transaction handler (103), for the transaction, etc.

In FIG. 7, the portal (143) is configured to match the transaction records (233 and 237) to link the merchant ID (305) to the merchant identifier (235), using one or more sets of corresponding fields of the transaction records (233 and 237).

For example, during the enrollment period, the portal (143) is configured to retrieve transactions records (237) for the predetermined account number (302) from the data warehouse (149); and the merchant aggregator (221) is configured to provide its transaction record (233) with the merchant identifier (235) to the portal (143). The portal (143) is configured to match the transaction records (233 and 237) based on the account number (302), the transaction date (303), and/or the transaction amount (304). When a match is detected, the merchant ID (305) (and the identifier of the transaction terminal (105)) from the transaction record (237) generated by the transaction handler (103) is linked to the merchant identifier (235) associated with the transaction record (233) stored by the merchant aggregator (221).

Using the system of FIG. 7, the merchant (227) can selectively enroll certain transaction terminals (105) operated under certain names and/or at certain locations. Thus, the merchant (227) may enroll a portion of the transaction terminals (105) under the control of the merchant (227) but not another portion of the transaction terminals (105) under the control of the merchant (227). Different transaction terminals e.g., 105) of a merchant may have different merchant ID (305) and/or transaction terminal IDs. Through transactions initiated using the different transaction terminals of the merchant, the merchant identifier (235) representing an enrolled merchant is linked to the different merchant ID (305) and/or transaction terminal IDs as used in authorization request for the transactions made using respective transaction terminals of the corresponding enrolled merchant.

In one embodiment, the transaction record (233) further includes the location information of the transaction terminal (105), which can be used for location based services. For example, in reporting the transaction initiated via using the predetermined account number (302) at the transaction terminal (105), the merchant (227) may specify the location of the transaction terminal (105) via a mobile device, a mobile application, a map application, or a street address. Thus, the location of the transaction terminal (105) is associated with the merchant ID (305) and/or the transaction terminal (105).

In one embodiment, the data warehouse (149) stores location information of transaction terminal (105) (e.g., as reported by the acquirer processor (147)) and provides the location information to the merchant aggregator (221) after the merchant ID (305) is linked to the merchant identifier (235) via the transaction record (237) for the transaction initiated on the transaction terminal (105).

In one embodiment, during the enrollment process, the merchant aggregator (221) instructs the merchant (227) to perform the transaction according to the data stored in the transaction record (223) and provides the transaction record (233) to the portal (143). In response, the portal (143) generates a trigger record (207) to detect the transaction that is subsequently initiated by the merchant at the transaction terminal (105). In one embodiment, the trigger record (207) is configured to cause the portal (143) to link the merchant ID (305) from the transaction record (237) of the identified transaction with the merchant identifier (235) associated with the transaction record (233) used to generate the trigger record (207).

In one embodiment, during the enrollment process, the merchant aggregator (221) is configured to request the portal (143) to generate a set of transaction parameters to temporarily identify a transaction terminal (105) of a merchant (227). The portal (143) is configured to transmit the parameters to the merchant aggregator as part of the transaction record (233) for initiation of the transaction. Examples of the parameters include the transaction amount, a pseudo-promotional code to be transmitted in an authorization request initiated in the transaction terminal (105). After the parameters are transmitted to the merchant aggregator (221), the transaction handler (103) is configured to monitor transactions to detect the transaction made, in the predetermined account, using the parameters provided to the merchant aggregator (221). Thus, as soon as the authorization request for the expected transaction reaches the transaction handler (103), the portal (143) can identify the merchant ID (305) and/or the transaction terminal ID of the respective transaction terminal (105) from the received authorization request, for association with the transaction terminal (105) of the merchant (227) to be enrolled.

In one embodiment, the transaction handler (103) is configured to monitor and detect a plurality of transactions initiated to enroll a plurality of different merchants and/or different transaction terminals of the enrolled merchants. To separately identify the merchants and/or the transaction terminals, the portal (143) and/or the merchant aggregator (221) are configured to select the transaction parameters (e.g., transaction amounts) as temporary unique identifiers of the merchants and/or transaction terminals. A data warehouse (e.g., 149) is configured to store data associating the temporary unique identifiers with the merchants and/or transaction terminals. After a transaction is performed and detected, the temporary association between the corresponding transaction parameters with the merchants and/or transaction terminals can be removed and/or reused for the identification of further merchants and/or transaction terminals.

In one embodiment, the transaction parameters configured as temporary identifiers of the enrolled merchants and/or transaction terminals are used to create trigger records to detect the subsequent authorization requests initiated from the corresponding transaction terminals of the enrolled merchants.

Some details about enrolling a merchant for communication via a merchant aggregator can be found in U.S. Pat. App. Pub. No. 2013/0073464, entitled "Systems and Methods to Communicate via a Merchant Aggregator", the entire disclosure of which is incorporated herein by reference.

Merchant Identification

In a payment transaction processing network, such as a system partially illustrated in FIG. 11 and further discussed in the section entitled "TRANSACTION PROCESSING AND DATA," a merchant may be represented by a merchant account (148). A transaction terminal (105) of the merchant has a terminal identifier that identifies the merchant account (148) in the payment transaction processing network. The system may store merchant information in association with the merchant account, such as a business name of the merchant, a business address of the merchant, etc.

However, in a large payment transaction processing network, it can be a challenging task to efficiently and accurately identify a particular merchant based on merchant information such as business name and/or business address, when the merchant information is submitted by a human user.

For example, a merchant may have a plurality of different business names. A business name associated with a merchant account (148) in the payment transaction processing system may be different from a business name typically used by the merchant in doing business outside the payment transaction processing system. For example, a merchant may use business names with slightly different spelling or wording in different business situations. For example, the business name of a merchant may be changed but not updated promptly in a data warehouse (149) that stores the merchant information for the merchant account (148). Some merchants have similar or same business names.

Further, it is desirable to have accurate location information of the transaction terminals (e.g., 105) of the merchants to provide location related services in connection with payment transaction processing.

Figure 8:
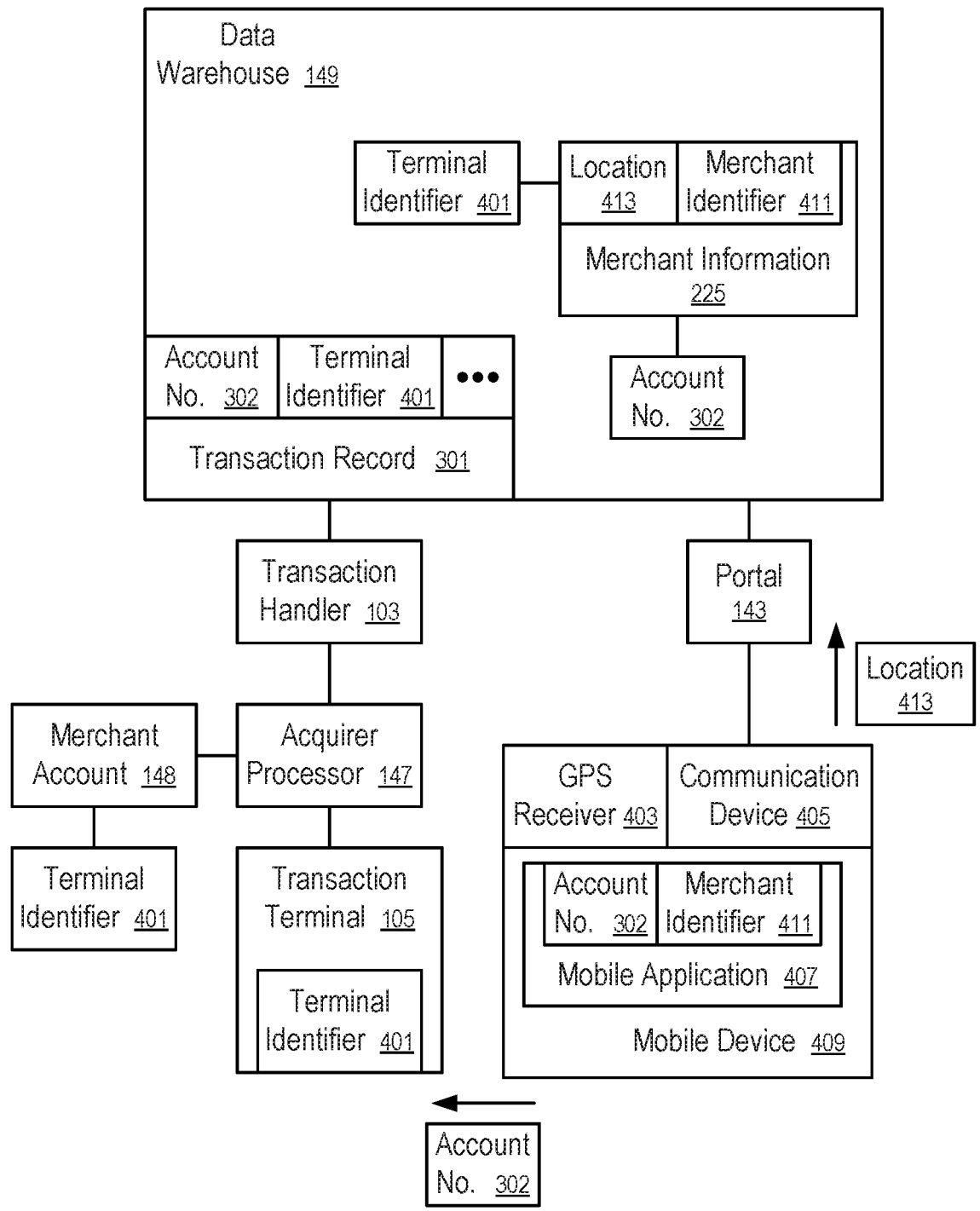
FIG. 8 shows a system to identify a merchant according to one embodiment.

FIG. 8 shows a system to identify a merchant according to one embodiment.

In FIG. 8, a mobile device (409) is configured with a mobile application (407) to facilitate the identification of the merchant. The mobile application (407) can be provided via, for example, downloading it from a portal (143) or an application store configured to deliver mobile applications to certain mobile devices (409).

In FIG. 8, the mobile device (409) includes a global positioning system (GPS) receiver (403) to determine the current position of the mobile device (409). When the mobile device (409) is positioned near the transaction terminal (105) of the merchant, or co-located with the transaction terminal (105), the position determined by the GPS receiver (403) can be used as the position of the transaction terminal (105).

Alternatively or in combination, the mobile device (409) may determine the current position of the mobile device (409) cellular communications signals, wireless local area communications signals, and/or an interactive map.

In FIG. 8, the mobile device (409) includes a communication device (405) configured to communicate with the portal (143) via a wired communication connection and/or a wireless communication connection. For example, the communication device (405) may include a wireless local area network transceiver configured to use a wireless local area network connection to connect to the Internet for communication with the portal (143). For example, the communication device (405) may include a cellular communications transceiver configured to use a cellular telecommunications connection to connect to the Internet for communication with the portal (143).

In FIG. 8, the mobile device (409) is configured to communicate with the portal (143) to authenticate the merchant using the mobile application (407) running in the mobile device (409).

For example, when the merchant participates in an offer program (e.g., by providing an offer (186) illustrated in FIG. 9 or FIG. 6), a unique merchant identifier (411) can be assigned to represent the merchant. The merchant identifier (411) is configured to uniquely identify the merchant among a plurality of merchants in the system, such as merchants identified in the data warehouse (149).

Access to merchant information (225) and/or services related to the unique merchant identifier (411) can be protected via credential information such as username and password. The mobile application (407) is configured to authenticate the merchant based on the credential information.

The merchant identifier (411) can be assigned to the merchant when the merchant installs and/or configures the mobile application (407) on the mobile device (409). For example, after the merchant signs up for the services provided by the portal (143), the merchant is prompted to set up username and password. After the merchant passes authentication operations on the mobile application (407), the merchant identifier (411) is stored in the mobile application (407) or mobile device (409) to represent the merchant.

For example, when the merchant enrolls in a program with a merchant aggregator (221) illustrated in FIG. 6, the merchant identifier (411) can be assigned to identify the merchant in both the merchant aggregator (221) and the data warehouse (149).

The mobile application (407) can be configured to instruct the merchant to position the mobile device (409) at or near the transaction terminal (105) to obtain a location (413) of the mobile device (409) that represents the location of the transaction terminal (105). The mobile application (407) then transmits the location (413) to the portal (143) for association with the merchant identifier (411) in the data warehouse (149).

In FIG. 8, the portal (143) is configured to provide an account number (302) to the mobile application (407) in response to receiving the location (413). The portal (143) stores data in the data warehouse (149) to temporarily associate the account number (302) to the location (413).

In FIG. 8, the account number (302) is independent from the merchant account (148) in which the merchant receives payments processed by an acquirer processor (147) on behalf of the merchant. The account number (302) assigned to temporarily represent the location (413) and/or the merchant identifier (411) in the data warehouse (149) can be a one-time account number, or be set to expire within a short period of time.

The period of time in which the account number (302) can be reduced to such that if the mobile device (409) is in close proximity to the transaction terminal (105), the account number (302) presented by the mobile application (407) can be used on the transaction terminal (105) to initiate a transaction within the period of time, and if the mobile device (409) is not in close proximity to the transaction terminal (105), it would be difficult to use the account number (302) presented by the mobile application (407) on the transaction terminal (105) to initiate a transaction within the period of time in which the account number (302) is valid.

For example, the mobile application (407) may display the account number (302) to allow the merchant to key in the account number (302) on the transaction terminal (105) to initiate an authorization request for a transaction in an account uniquely identified by the account number (302).

For example, the mobile application (407) may include a near field communication device that is configured to communicate the account number (302) to the transaction terminal (105) via near field communication. When the mobile device (409) and the transaction terminal (105) are in range for near field communication, the location (413) of the mobile device (409) as determined by the mobile device (409) represents an accurate measurement of the location (413) of the transaction terminal (105). The mobile application (407) can be configured to determine the location (413) for transmission to the portal (143) while the mobile device (409) and the transaction terminal (105) are in range for near field communication, such as before, during, or after the communication of the account number (302) to the transaction terminal (105) via near field communication.

In some implementations, the mobile device (409) can be configured to establish a wired or wireless communication connection with the transaction terminal (105) to provide the account number (302). Examples of such a communication connection include a Bluetooth connection, a personal wireless area network communication connection, a Universal Serial Bus (USB) connection, etc. The use of a wired communication connection or a wireless connection of a short communication range can improve the accuracy of the location (413) measured using the location determination system of the mobile device (409), such as the GPS receiver (403).

In FIG. 8, the transaction terminal (105) has a terminal identifier (401) that is associated with the merchant account (148) in the payment transaction processing network interconnected by a transaction handler (103). After the authorization request for the transaction made on the transaction terminal (105) using the account number (302) provided via the mobile application (407) is processed by the transaction handler (103), a transaction record (301) for the transaction is generated and stored in the data warehouse (149) that is coupled with both the transaction handler (103) and the portal (143). The transaction record (301) includes the account number (302) provided to the transaction terminal (105) via the mobile application (407) and the terminal identifier (401) of the transaction terminal (105).

If the transaction corresponding to the transaction record (301) is determined to be valid (e.g., within the predetermined time period in which the account number (302) is valid and associated with the location (413), within the predetermined limit on number of uses of the account number (302)), the portal (143) and/or the transaction handler (103) (or a separate computing device) extracts the terminal identifier (401) from the transaction record (301) and stores data in the data warehouse (149) to associate the terminal identifier (401) with the location (413) measured for the transaction terminal (105) and the merchant identifier (411).

After the temporary association between the account number (302) and merchant information (225) is replaced in the data warehouse (149) with the association between the terminal identifier (401) and the merchant information (225), the merchant information (225) can be identified and used for transactions initiated on the transaction terminal (105) of the merchant. When a subsequent transaction includes the terminal identifier (401), the transaction can be identified to be at the location (413) and with the merchant represented by the merchant identifier (411).

For example, if an offer (186) (e.g., illustrated in FIG. 9 or 4) requires a payment transaction with the merchant identified by the merchant identifier (411), the transaction handler (103) and/or the portal (143) can be configured to detect such a payment transaction based on the terminal identifiers (e.g., 401) associated with the merchant identifier (411).

The merchant may have a plurality of transaction terminals (e.g., 105), and the mobile application (411) can be used multiple times to measure the locations (e.g., 413) of the transaction terminal (e.g., 105), associate the measured locations (e.g., 413) with the terminal identifiers (e.g., 401) of the respective transaction terminals (e.g., 105), and associate the terminal identifiers (e.g., 401) of the merchant with the merchant identifier (411) of the merchant.

The portal (143) may provide different one-time account numbers (e.g., 302) for identification of the different transaction terminals (e.g., 105) of the merchant. Alternatively, the account number (302) may be configured to be valid for use multiple times within a period of time.

When the account number (302) can be used multiple times on different transaction terminals (e.g., 105) of the merchant, the system may be configured to measure one location (413) representing the set of the transaction terminals (e.g., 105). Alternatively, the transaction handler (103) and/or the portal (143) may correlate the transactions initiated on the transaction terminals (e.g., 105) and local measurements based on time sequence.

For example, the mobile application (407) may provide the account number (302) to initiate an authorization request for a transaction on the transaction terminal (105) and report the location (413) measured for the transaction terminal (105) within a short period of time (e.g., shorter than a time period for the merchant to move the mobile device to another transaction terminal). Thus, the authorization request generated from the transaction terminal (105) can be corrected to the location (413) measured from the transaction terminal (105) based on the timestamp associated with the reporting of the measured location (413) and the timestamp of the authorization request.

Alternatively or in combination, different transaction amounts can be used to tell the different transaction terminals (105) apart. For example, during the identification of the transaction terminal (105), the mobile application (407) presents not only the account number (302), but also the transaction amount of the transaction to be initiated on the transaction terminal (105). Thus, the transaction for the particular transaction terminal (105) can be identified based on the combination of the transaction amount and the account number (302).

In one embodiment, a computing apparatus/system is configured to: provide a mobile application (407) on a mobile device (409) having a position determination system (e.g., GPS receiver (403)); authenticate, using the mobile application (407), a merchant represented by a merchant identifier (411) to perform operations in association with the merchant identifier (411); determine a position of the mobile device (409) using the mobile application (407) while the mobile device (409) is near or co-located with a transaction terminal (401) of the merchant, such that the position can be used as a measurement of the location (413) of the transaction terminal (401); in association with the merchant identifier (411), communicate the position (e.g., location (413)) to a portal (143) and receive an account number (302) from the portal; initiate, on the transaction terminal (105), an authorization request for a transaction in an account specified by the account number (302); extract a terminal identifier (401) of the transaction terminal (105) from the authorization request that identifies the account number (302); and replace the account number (302) with the terminal identifier (401) for association with the position (e.g., location (413)) and/or the merchant identifier (411).

The computing apparatus/system may include one or more of the portal (143), the data warehouse (149), the mobile device (409), the transaction terminal (105), and the transaction handler (103).

For example, the computing system can be implemented using one or more data processing systems illustrated in FIG. 14, each of which has at least one microprocessor (173) and memory (167) storing instructions configured to instruct the at least one microprocessor to perform operations. The computing system may include: a transaction handler (103) configured to process payment transactions in a payment processing network and generate transaction data (106) recording the payment transactions processed by the transaction handler; and a portal (143) configured to communicate with a mobile application (407) executing in a mobile device (409) having a communication device (405) and a GPS receiver (403), where the mobile application (407) is configured to instruct the GPS receiver (403) to determine a position (e.g., location (413)) of the mobile device (409) while the mobile device (409) is positioned in the vicinity of a transaction terminal (105) of a merchant, authenticating the merchant represented by a merchant identifier (411). After the merchant is authenticated via the mobile application (407), the portal (143) communicates with the mobile application (407), via the communication device (405), to receive the position (e.g., location (413)) from the mobile application (407) and provides an account number (302) to the mobile application (407) for the initiation of a transaction on the transaction terminal (105).

The computing system may further include a data warehouse (149) coupled with the portal (143) and the transaction handler (103) to store merchant information (225), including the position (e.g., location (413)) received from the mobile application (407), where the position (e.g., location (413)) is stored in association with the merchant identifier (411) that uniquely identifies the merchant among a plurality of merchants in the data warehouse (149). The data warehouse (149) may further store first data associating the account number (302) with the merchant information (225), and a transaction record (301) of the transaction initiated, on the transaction terminal (105) of the merchant, using the account number (302) while the account number (302) is associated with the merchant information (225), where the transaction record (301) includes the account number (302) and the terminal identifier (401) of the transaction terminal (105).

The computing system is configured, via instructions, to identify the transaction record (301) based on the account number (302), extract the terminal identifier (401) from the identified transaction record (301), identify the merchant information (225) that is associated with the account number (302) in the data warehouse (149), and store in the data warehouse (149) second data associating the terminal identifier (401) with the merchant information (225).

The computing system may remove the first data associating the account number (302) with the merchant information (225), after the second data associating the terminal identifier (401) with the merchant information (225) is stored in the data warehouse (149).

The computing system can be further configured to: detect a subsequent transaction initiated on the transaction terminal (105) having the terminal identifier (401); determine the terminal identifier (401) used in the subsequent transaction; and determine the location (413) of the subsequent transaction and the merchant identifier (411) of the subsequent transaction based on matching the terminal identifier (401) used in the subsequent transaction and the terminal identifier (401) in the second data.

The account number (302) can be, for example, a one-time account number (302) valid for one time use. The one-time account number (302) can be generated in response to receiving the location (413) from the mobile application (407), or in anticipation of the mobile application (407) submitting the location (413).

The mobile device can be configured, for example, to present the account number (302) on a display device and determine the position (e.g., location (413)) of the mobile device (409) while the account number (302) is presented on the display device. The time period of the display of the account number (302) on the mobile application (407) can be limited to encourage the determination of the position (e.g., location (413)) of the mobile device (409) in the vicinity of the transaction terminal (105).

The mobile device (409) can be configured to communicate the account number (302) to the transaction terminal (105) via near field communication, and determine the position of the mobile device (409) as the measured location (413) of the transaction terminal (105) while the mobile device (409) and the transaction terminal (105) are in communication range for near field communication.

The mobile device (409) can also be implemented using a data processing system illustrated in FIG. 14. For example, the mobile device (409) includes a communication device (405), a GPS receiver (403), at least one microprocessor (173) coupled with the communication device (405) and the GPS receiver (403), and memory (167) storing instructions configured to instruct the at least one microprocessor (173) to perform operations. The instructions include a mobile application (407) configured to: authenticate a merchant represented by a merchant identifier (411); determine, using the GPS receiver (403), a location (413) of the mobile device (409) while the mobile device (409) is positioned in the vicinity of a transaction terminal (105) of the merchant; and communicate, using the communication device (405), with the portal (143) to provide the location (413) in association with the merchant identifier (411), and to receive an account number (302) for the initiation of a transaction using the transaction terminal (105).

Figure 10:
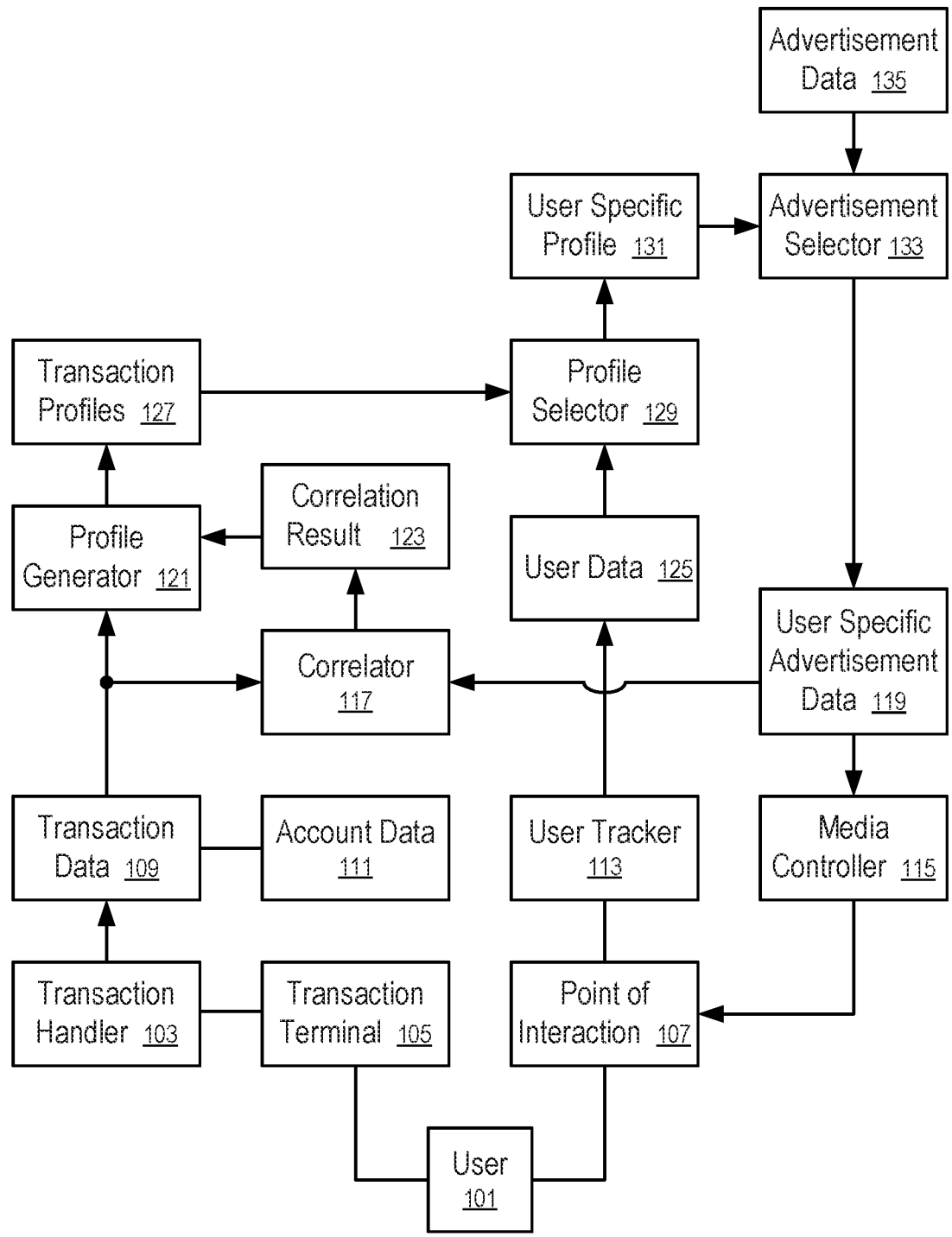
FIG. 10 illustrates a system to provide services based on transaction data according to one embodiment.

The portal (143) is coupled with a data warehouse (149) storing transaction data (109) (as illustrated in FIG. 10) recording payment transactions processed by the transaction handler (103) of a payment processing network, and the data warehouse (149) is coupled with the portal (143) and the transaction handler (103) to store: merchant information (225), such as the location (413) received from the mobile application (407) and the merchant identifier (411); first data associating the account number (302) with the merchant information (225), before a terminal identifier of the transaction terminal (106) of the merchant replaces it with the account number (302); and a transaction record (301) of the transaction initiated using the account number (302) on the transaction terminal (105) of the merchant while the account number (302) is associated with the merchant information (225), where the transaction record (301) includes the account number (302) and a terminal identifier (401) of the transaction terminal (401).

The portal (143) can be configured to identify the transaction record (301) having the account number (302), extract the terminal identifier (401) from the transaction record (301), identify the merchant information (225) associated with the account number (302) in the data warehouse (149) in accordance with the first data, and store in the data warehouse (149) second data associating the terminal identifier (401) with the merchant information (225).

The account number (302) may be set to be valid for one time use within a predetermined period of time. The mobile device (407) may further include a display device, on which the mobile application (409) is configured to present the account number (302) while determining the location (413) of the mobile device (409).

The account number (302) may be displayed at least in a bar code format such that a bar code scanner of the transaction terminal (105) can read the account number (302). Alternatively, the transaction terminal (105) may include a key pad to receive manual input of the account number (302) from the person using the mobile device (409). Alternatively, the mobile device (409) may include a near field communication device configured to communicate/present the account number (302) to the transaction terminal (105) to initiate the transaction corresponding to the transaction record (301). When the near field communication device (405) is used, the mobile device (409) can be configured to determine and report the location (413) of the mobile device (409) while the mobile device (409) and the transaction terminal (105) are in communication range for near field communication.

In some instances, the mobile device (409) may be integrated within the transaction terminal (105); and the mobile application (407) can be downloaded and installed on the transaction terminal (105) to perform the operations described herein.

The mobile application (407) may be provided by the portal (143) for installation on the mobile device (409) of the merchant. The merchant is prompted to provide input to the mobile application (407) to authenticate that a user of the mobile application (407) is authorized by the merchant represented by a merchant identifier (411) that uniquely identifies the merchant in an application outside the payment processing network. The mobile application (407) is used to provide an account number (302) to a transaction terminal (105) directly or indirectly, while measuring a location (413) of the transaction terminal (105) using a GPS receiver (403). Thus, the measured location (413) of the transaction terminal (105) can be associated with the merchant identifier (411), and after the terminal identifier (401) of the transaction terminal (105) is extracted from the authorization request generated on the transaction terminal (105) using the account number (302), the terminal identifier (401) can be associated with the measured location (413) of the transaction terminal (105) and the merchant identifier (411). The operations can be repeated for different transaction terminals (e.g., 105) to measure their locations (e.g., 413) and to associate their terminal identifiers (401) with the merchant identifier (411). The merchant information (225) may include information such as the business name of the merchant, a street or mailing address of the merchant, online access credential, etc.

Some details about using the mobile device (409) in enrolling a merchant for communication triggered via a payment processing system can be found in U.S. Pat. No. 8,706,557, entitled "Systems and methods to identify merchants", the entire disclosure of which is incorporated herein by reference.

Real-Time Messages

In one embodiment, the transaction handler (103) is configured to cooperate with the media controller (115) to facilitate real-time interaction with the user (101) when the payment of the user (101) is being processed by the transaction handler (103). The real-time interaction provides the opportunity to impact the user experience during the purchase (e.g., at the time of card swipe), through delivering messages in real-time to a point of interaction (107), such as a mobile phone, a personal digital assistant, a portable computer, etc. The real-time message can be delivered via short message service (SMS), email, instant messaging, or other communications protocols.

In one embodiment, the real-time message is provided without requiring modifications to existing systems used by the merchants and/or issuers.

FIG. 9 shows a system to provide real-time messages according to one embodiment. In FIG. 9, the transaction handler (103) (or a separate computing system coupled with the transaction handler (103)) is to detect the occurrence of certain transactions of interest during the processing of the authorization requests received from the transaction terminal (105); a message broker (201) is to identify a relevant message for the user (101) associated with the corresponding authorization request; and the media controller (115) is to provide the message to the user (101) at the point of interaction (107) via a communication channel separate from the channel used by the transaction handler (103) to respond to the corresponding authorization request submitted from the transaction terminal (105).

In one embodiment, the media controller (115) is to provide the message to the point of interaction (107) in parallel with the transaction handler (103) providing the response to the authorization request.

In one embodiment, the point of interaction (107) receives the message from the media controller (115) in real-time with the transaction handler (103) processing the authorization request. In one embodiment, the message is to arrive at the point of interaction (107) in the context of the response provided from the transaction handler (103) to the transaction terminal (105). For example, the message is to arrive at the point of interaction (107) substantially at the same time as the response to the authorization request arrives at the transaction terminal (105), or with a delay not long enough to cause the user (101) to have the impression that the message is in response to an action other than the payment transaction. For example, the message is to arrive at the point of interaction (107) prior to the user (101) completing the transaction and leaving the transaction terminal (105), or prior to the user (101) leaving the retail location of the merchant operating the transaction terminal (105).

In FIG. 9, the system includes a portal (143) to provide services to merchants and/or the user (101).

For example, in one embodiment, the portal (143) allows the user (101) to register the communication reference (205) in association with the account data (111), such as the account information (142) of the consumer account (146); and the media controller (115) is to use the communication reference (205) to deliver the message to the point of interaction (107). Examples of the communication reference (205) include a mobile phone number, an email address, a user identifier of an instant messaging system, an IP address, etc.

In one embodiment, the portal (143) allows merchants and/or other parties to define rules (203) to provide offers (186) as real-time responses to authorization requests; and based on the offer rules (203), the message broker (201) is to generate, or instruct the media controller (115) to generate, the real-time message to provide the offers (186) to the user (101). For example, the offer (186) may include a discount, incentive, reward, rebate, gift, or other benefit, which can be redeemed upon the satisfaction of certain conditions required by the offer rules (203). In one embodiment, based on the offer rules (203) the message broker (201) configures a message by selecting the appropriate message template from (an) existing message(s) template(s), and inserts any relevant data (e.g., the communication reference (205)) into the selected template, then passes the configured message to the media controller (115), which delivers the message to the point of interaction (107). In one embodiment, the message broker (201) (or a subsystem) is used to manage message templates along with the rules for selecting the appropriate message template from among several potential choices.

In one embodiment, the offer rules (203) include offer details, targeting rules, advertisement campaign details, profile mapping, creative mapping, qualification rules, award/ notify/fulfillment rules, approvals, etc. Creative elements for offers include text, images, channels, approvals, etc.

In one embodiment, when the offer rules (203) are activated by the merchant or advertiser via the portal (143), the message broker (201) is to generate trigger records (207) for the transaction handler (103). The transaction handler (103) is to monitor the incoming authorization requests to identify requests that satisfy the conditions specified in the trigger records (207) during the process of the authorization requests, and to provide the information about the identified requests to the message broker (201) for the transmission of an appropriate real-time message in accordance with the offer rules (203).

In one embodiment, the generation of the trigger records (207) for the transaction handler (103) is in real-time with the merchant or advertiser activating the offer rules (203). Thus, the offer rules (203) can be activated and used for the detection of the new authorization requests in real-time, while the transaction handler (103) continues to process the incoming authorization requests.

In one embodiment, the portal (143) provides information about the spending behaviors reflected in the transaction data (109) to assist the merchants or advertisers to target offers or advertisements. For example, in one embodiment, the portal (143) allows merchants to target the offers (186) based on transaction profiles (127). For example, the offer rules (203) are partially based on the values in a transaction profile (127), such as an aggregated spending profile. In one embodiment, the offer rules (203) are partially based on the information about the last purchase of the user (101) from the merchant operating the transaction terminal (105) (or another merchant), and/or the information about the location of the user (101), such as the location determined based on the location of the transaction terminal (105) and/or the location of the merchant operating the transaction terminal (105).

In one embodiment, the portal (143) provides transaction based statistics, such as merchant benchmarking statistics, industry/market segmentation, etc., to assist merchants and advertisers to identify customers.

Thus, the real-time messages can be used to influence customer behaviors while the customers are in the purchase mode.

In one embodiment, the benefit of the offers (186) can be redeemed via the transaction handler (103). The redemption of the offer (186) may or may not require the purchase details (e.g., SKU level purchase details). Details in one embodiment about redeeming offers (186) via the transaction handler (103) are provided in U.S. Pat. App. Pub. No. 2011/0288918, entitled "Systems and Methods for Redemption of Offers," the disclosure of which is hereby incorporated herein by reference.

In one embodiment, when the authorization request for a purchase indicates that the purchase qualifies the offer (186) for redemption if the purchase corresponding to the authorization request is completed, the message broker (201) is to construct a message and use the media controller (115) to deliver the message in real-time with the processing of the authorization request to the point of interaction (107). The message informs the user (101) that when the purchase is completed, the transaction handler (103) and/or the issuer processor (145) is to provide the benefit of the offer (186) to the user (101) via statement credit or some other settlement value, for example points in a registered loyalty program, or credit at the point of sale using a digital coupon delivered to the purchaser via mobile phone.

In one embodiment, the settlement of the payment transaction corresponding to the authorization request does not occur in real-time with the processing of the authorization request. For example, the merchant may submit the complete purchases for settlement at the end of the day, or in accordance with a predetermined schedule. The settlement may occur one or more days after the processing of the authorization request.

In one embodiment, when transactions are settled, the settled transactions are matched to the authorization requests to identify offers (186) that are redeemable in view of the settlement. When the offer (186) is confirmed to be redeemable based on a record of successful settlement, the message broker (201) is to use the media controller (115) to provide a message to the point of interaction (107) of the user (101), such as the mobile phone of the user (101). In one embodiment, the message is to inform the user (101) of the benefit to be provided as statement credits and/or to provide additional offers. In one embodiment, the message to confirm the statement credits is transmitted in real-time with the completion of the transaction settlement.

In one embodiment, the message broker (201) is to determine the identity of the merchant based on the information included in the authorization request transmitted from the transaction terminal (105) to the transaction handler (103). In one embodiment, the identity of the merchant is normalized to allow the application of the offer rules (203) that are merchant specific.

Details on real-time messages in one embodiment are provided in U.S. Pat. No. 8,359,274, issued Jan. 22, 2013 and entitled "Systems and Methods to Provide Messages in Real-Time with Transaction Processing," the disclosure of which is hereby incorporated herein by reference.

Transaction Data Based Services

FIG. 10 illustrates a system to provide services based on transaction data according to one embodiment. In FIG. 10, the system includes a transaction terminal (105) to initiate financial transactions for a user (101), a transaction handler (103) to generate transaction data (109) from processing the financial transactions of the user (101) (and the financial transactions of other users), a profile generator (121) to generate transaction profiles (127) based on the transaction data (109) to provide information/intelligence about user preferences and spending patterns, a point of interaction (107) to provide information and/or offers to the user (101), a user tracker (113) to generate user data (125) to identify the user (101) using the point of interaction (107), a profile selector (129) to select a profile (131) specific to the user (101) identified by the user data (125), and an advertisement selector (133) to select, identify, generate, adjust, prioritize and/or personalize advertisements for presentation to the user (101) on the point of interaction (107) via a media controller (115).

In FIG. 10, the system further includes a correlator (117) to correlate user specific advertisement data (119) with transactions resulting from the user specific advertisement data (119). The correlation results (123) can be used by the profile generator (121) to improve the transaction profiles (127).

The transaction profiles (127) of one embodiment are generated from the transaction data (109) in a way as illustrated in U.S. Pat. App. Pub. No. 2010/0306029, entitled "Cardholder Clusters," and U.S. Pat. App. Pub. No. 2010/0306032, entitled "Systems and Methods to Summarize Transaction Data," the disclosures of which applications are hereby incorporated herein by reference.

In one embodiment, a data warehouse (149) as illustrated in FIG. 11 is coupled with the transaction handler (103) to store the transaction data (109) and other data, such as account data (111), transaction profiles (127) and correlation results (123). In FIG. 11, a portal (143) is coupled with the data warehouse (149) to provide data or information derived from the transaction data (109), in response to a query request from a third party or as an alert or notification message.

In FIG. 11, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user (101) and the merchant.

Figure 12:
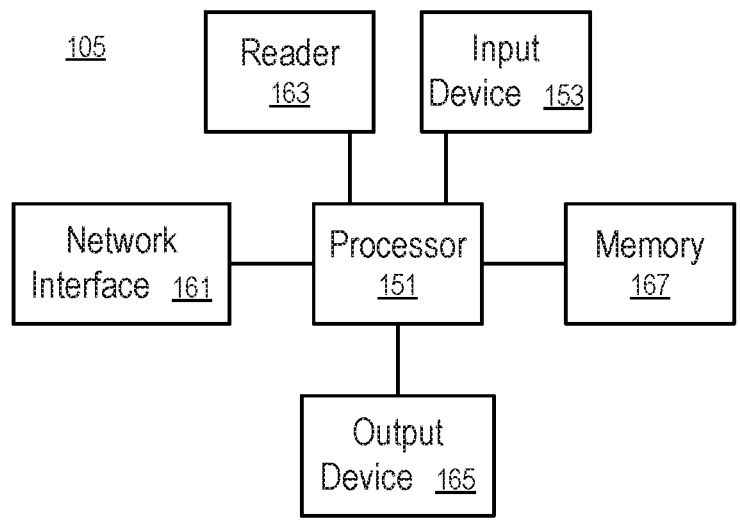
FIG. 12 illustrates a transaction terminal according to one embodiment.
Figure 13:
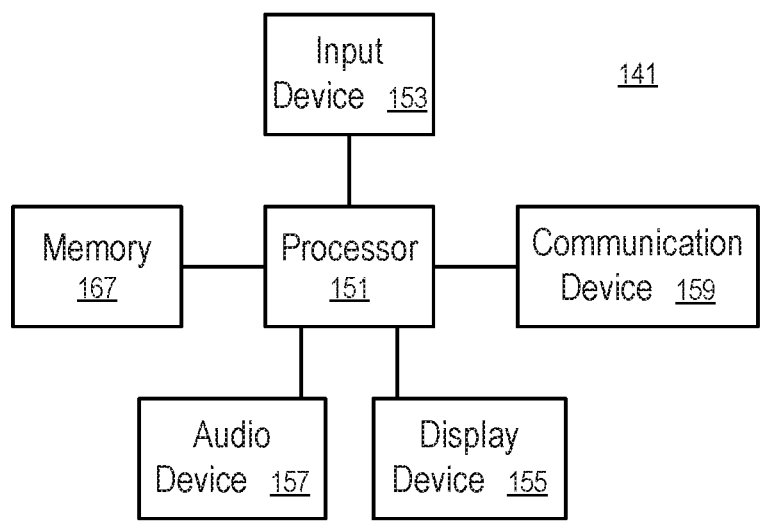
FIG. 13 illustrates an account identifying device according to one embodiment.

FIGS. 12 and 13 illustrate examples of transaction terminals (105) and account identification devices (141). FIG. 14 illustrates the structure of a data processing system (170) that can be used to implement, with more or fewer elements, at least some of the components in the system, such as the point of interaction (107), the transaction handler (103), the portal (143), the data warehouse, the account identification device (141), the transaction terminal (105), the user tracker (113), the profile generator (121), the profile selector (129), the advertisement selector (133), the media controller (115), etc. Some embodiments use more or fewer components than those illustrated, such as, in FIGS. 10-14, and other figures, as further discussed in the section entitled "VARIATIONS."

In one embodiment, the transaction data (109) relates to financial transactions processed by the transaction handler (103); and the account data (111) relates to information about the account holders involved in the transactions. Further data, such as merchant data that relates to the location, business, products and/or services of the merchants that receive payments from account holders for their purchases, can be used in the generation of the transaction profiles (127, 341).

In one embodiment, the financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information (142), without physically presenting the account identification device (141).

Further features, modifications and details are provided in various sections of this description.

Centralized Data Warehouse

In one embodiment, the transaction handler (103) couples with a centralized data warehouse (149) organized around the transaction data (109). For example, the centralized data warehouse (149) may include, and/or support the determination of, spend band distribution, transaction count and amount, merchant categories, merchant by state, cardholder segmentation by velocity scores, and spending within merchant target, competitive set and cross-section. For example, the centralized data warehouse (149) may include the advertisement data (135) and/or offers of benefits such as discount, reward, points, cashback, etc. The offers can be communicated to the users (e.g., 101) via the advertisement data (135) or as part of the advertisement data (135).

In one embodiment, the centralized data warehouse (149) provides centralized management but allows decentralized execution. For example, a third party strategic marketing analyst, statistician, marketer, promoter, business leader, etc., may access the centralized data warehouse (149) to analyze customer and shopper data, to provide follow-up analyses of customer contributions, to develop propensity models for increased conversion of marketing campaigns, to develop segmentation models for marketing, etc. The centralized data warehouse (149) can be used to manage advertisement campaigns and analyze response profitability.

In one embodiment, the centralized data warehouse (149) includes merchant data (e.g., data about sellers), customer/business data (e.g., data about buyers), and transaction records (301) between sellers and buyers over time. The centralized data warehouse (149) can be used to support corporate sales forecasting, fraud analysis reporting, sales/customer relationship management (CRM) business intelligence, credit risk prediction and analysis, advanced authorization reporting, merchant benchmarking, business intelligence for small business, rewards, etc.

In one embodiment, the transaction data (109) is combined with external data, such as surveys, benchmarks, search engine statistics, demographics, competition information, emails, etc., to flag key events and data values, to set customer, merchant, data or event triggers, and to drive new transactions and new customer contacts.

Examples of targeted offer delivery in one embodiment are provided in U.S. Pat. App. Pub. No. 2010/0030644, entitled "Targeted Advertising by Payment Processor History of Cashless Acquired Merchant Transaction on Issued Consumer Account," and in U.S. Pat. App. Pub. No. 2011/0035280, entitled "Systems and Methods for Targeted Advertisement Delivery," the disclosures of which applications are hereby incorporated herein by reference.

Transaction Processing and Data

FIG. 11 shows a system to provide information and/or services based on transaction data (109) according to one embodiment.

In FIG. 11, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide information based on the transaction records (301), such as the transaction profiles (127), aggregated spending profile, offer redemption notification, etc. The portal (143) may be implemented as a web portal, a telephone gateway, a file/data server, etc.

In FIG. 11, the transaction terminal (105) initiates the transaction for a user (101) (e.g., a customer) for processing by a transaction handler (103). The transaction handler (103) processes the transaction and stores transaction data (109) about the transaction, in connection with account data (111), such as the account profile of an account of the user (101). The account data (111) may further include data about the user (101), collected from issuers or merchants, and/or other sources, such as social networks, credit bureaus, merchant provided information, address information, etc. In one embodiment, a transaction may be initiated by a server (e.g., based on a stored schedule for recurrent payments).

The accumulated transaction data (109) and the corresponding account data (111) are used to generate intelligence information about the purchase behavior, pattern, preference, tendency, frequency, trend, amount and/or propensity of the users (e.g., 101), as individuals or as a member of a group. The intelligence information can then be used to generate, identify and/or select targeted advertisements for presentation to the user (101) on the point of interaction (107), during a transaction, after a transaction, or when other opportunities arise.

In FIG. 11, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user (101)) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

The account identification device (141) of one embodiment is a plastic card having a magnetic strip storing account information (142) identifying the consumer account (146) and/or the issuer processor (145). Alternatively, the account identification device (141) is a smartcard having an integrated circuit chip storing at least the account information (142). The account identification device (141) may optionally include a mobile phone having an integrated smartcard.

The account information (142) may be printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

The transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

The transaction handler (103), the issuer processor (145), and the acquirer processor (147) may each include a subsystem to identify the risk in the transaction and may reject the transaction based on the risk assessment.

The account identification device (141) may include security features to prevent unauthorized uses of the consumer account (146), such as a logo to show the authenticity of the account identification device (141), encryption to protect the account information (142), etc.

The transaction terminal (105) of one embodiment is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user (101) through a web connection. In one embodiment, the user (101) may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In general, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. Dedicated communication channels may be used between the transaction handler (103) and the issuer processor (145), between the transaction handler (103) and the acquirer processor (147), and/or between the portal (143) and the transaction handler (103).

In FIG. 11, the transaction handler (103) uses the data warehouse (149) to store the records about the transactions, such as the transaction records (301) or transaction data (109).

Typically, the transaction handler (103) is implemented using a powerful computer, or cluster of computers functioning as a unit, controlled by instructions stored on a computer readable medium. The transaction handler (103) is configured to support and deliver authorization services, exception file services, and clearing and settlement services.

The transaction handler (103) has a subsystem to process authorization requests and another subsystem to perform clearing and settlement services. The transaction handler (103) is configured to process different types of transactions, such credit card transactions, debit card transactions, prepaid card transactions, and other types of commercial transactions. The transaction handler (103) interconnects the issuer processors (e.g., 145) and the acquirer processor (e.g., 147) to facilitate payment communications.

In FIG. 11, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In FIG. 11, the issuer processor (145) is configured to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. The funds can be transferred electronically.

The transaction terminal (105) may submit a transaction directly for settlement, without having to separately submit an authorization request.

In one embodiment, the portal (143) provides a user interface to allow the user (101) to organize the transactions in one or more consumer accounts (146) of the user with one or more issuers. The user (101) may organize the transactions using information and/or categories identified in the transaction records (301), such as merchant category, transaction date (303), amount (304), etc. Examples and techniques in one embodiment are provided in U.S. Pat. App. Pub. No. 2007/0055597, entitled "Method and System for Manipulating Purchase Information," the disclosure of which is hereby incorporated herein by reference.

In one embodiment, the portal (143) provides transaction based statistics, such as indicators for retail spending monitoring, indicators for merchant benchmarking, industry/market segmentation, indicators of spending patterns, etc. Further examples can be found in U.S. Pat. App. Pub. No. 2009/0048884, entitled "Merchant Benchmarking Tool," the disclosure of which application is hereby incorporated herein by reference.

Transaction Terminal

FIG. 12 illustrates a transaction terminal according to one embodiment. The transaction terminal (105) illustrated in FIG. 12 can be used in various systems discussed in connection with other figures of the present disclosure. In FIG. 12, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 12. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 12. For example, in one embodiment, the transaction terminal (105) is an ATM machine, which includes components to dispense cash under certain conditions.

Account Identification Device

FIG. 13 illustrates an account identifying device according to one embodiment. In FIG. 13, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 13, such as a cellular communications subsystem.

In one embodiment, the communication device (159) may access the account information (142) stored on the memory (167) without going through the processor (151).

In one embodiment, the account identification device (141) has fewer components than those illustrated in FIG. 13. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

Point of Interaction

In one embodiment, the point of interaction (107) is to provide an advertisement to the user (101), or to provide information derived from the transaction data (109) to the user (101).

In one embodiment, an advertisement is a marketing interaction which may include an announcement and/or an offer of a benefit, such as a discount, incentive, reward, coupon, gift, cash back, or opportunity (e.g., special ticket/admission). An advertisement may include an offer of a product or service, an announcement of a product or service, or a presentation of a brand of products or services, or a notice of events, facts, opinions, etc. The advertisements can be presented in text, graphics, audio, video, or animation, and as printed matter, web content, interactive media, etc. An advertisement may be presented in response to the presence of a financial transaction card, or in response to a financial transaction card being used to make a financial transaction, or in response to other user activities, such as browsing a web page, submitting a search request, communicating online, entering a wireless communication zone, etc. In one embodiment, the presentation of advertisements may be not a result of a user action.

In one embodiment, the point of interaction (107) can be one of various endpoints of the transaction network, such as point of sale (POS) terminals, automated teller machines (ATMs), electronic kiosks (or computer kiosks or interactive kiosks), self-assist checkout terminals, vending machines, gas pumps, websites of banks (e.g., issuer banks or acquirer banks of credit cards), bank statements (e.g., credit card statements), websites of the transaction handler (103), websites of merchants, checkout websites or web pages for online purchases, etc.

In one embodiment, the point of interaction (107) may be the same as the transaction terminal (105), such as a point of sale (POS) terminal, an automated teller machine (ATM), a mobile phone, a computer of the user for an online transaction, etc. In one embodiment, the point of interaction (107) may be co-located with, or near, the transaction terminal (105) (e.g., a video monitor or display, a digital sign), or produced by the transaction terminal (e.g., a receipt produced by the transaction terminal (105)). In one embodiment, the point of interaction (107) may be separate from and not co-located with the transaction terminal (105), such as a mobile phone, a personal digital assistant, a personal computer of the user, a voice mail box of the user, an email inbox of the user, a digital sign, etc.

For example, the advertisements can be presented on a portion of media for a transaction with the customer, which portion might otherwise be unused and thus referred to as a "white space" herein. A white space can be on a printed matter (e.g., a receipt printed for the transaction, or a printed credit card statement), on a video display (e.g., a display monitor of a POS terminal for a retail transaction, an ATM for cash withdrawal or money transfer, a personal computer of the customer for online purchases), or on an audio channel (e.g., an interactive voice response (IVR) system for a transaction over a telephonic device).

In one embodiment, the white space is part of a media channel available to present a message from the transaction handler (103) in connection with the processing of a transaction of the user (101). In one embodiment, the white space is in a media channel that is used to report information about a transaction of the user (101), such as an authorization status, a confirmation message, a verification message, a user interface to verify a password for the online use of the account information (142), a monthly statement, an alert or a report, or a web page provided by the portal (143) to access a loyalty program associated with the consumer account (146) or a registration program.

In other embodiments, the advertisements can also be presented via other media channels which may not involve a transaction processed by the transaction handler (103). For example, the advertisements can be presented on publications or announcements (e.g., newspapers, magazines, books, directories, radio broadcasts, television, digital signage, etc., which may be in an electronic form, or in a printed or painted form). The advertisements may be presented on paper, on websites, on billboards, on digital signs, or on audio portals.

In one embodiment, the transaction handler (103) purchases the rights to use the media channels from the owner or operators of the media channels and uses the media channels as advertisement spaces. For example, white spaces at a point of interaction (e.g., 107) with customers for transactions processed by the transaction handler (103) can be used to deliver advertisements relevant to the customers conducting the transactions; and the advertisement can be selected based at least in part on the intelligence information derived from the accumulated transaction data (109) and/or the context at the point of interaction (107) and/or the transaction terminal (105).

In general, a point of interaction (e.g., 107) may or may not be capable of receiving inputs from the customers, and may or may not co-located with a transaction terminal (e.g., 105) that initiates the transactions. The white spaces for presenting the advertisement on the point of interaction (107) may be on a portion of a geographical display space (e.g., on a screen), or on a temporal space (e.g., in an audio stream).

In one embodiment, the point of interaction (107) may be used to primarily to access services not provided by the transaction handler (103), such as services provided by a search engine, a social networking website, an online marketplace, a blog, a news site, a television program provider, a radio station, a satellite, a publisher, etc.

In one embodiment, a consumer device is used as the point of interaction (107), which may be a non-portable consumer device or a portable computing device. The consumer device is to provide media content to the user (101) and may receive input from the user (101).

Examples of non-portable consumer devices include a computer terminal, a television set, a personal computer, a set-top box, or the like. Examples of portable consumer devices include a portable computer, a cellular phone, a personal digital assistant (PDA), a pager, a security card, a wireless terminal, or the like. The consumer device may be implemented as a data processing system as illustrated in FIG. 14, with more or fewer components.

In one embodiment, the consumer device includes an account identification device (141). For example, a smart card used as an account identification device (141) is integrated with a mobile phone, or a personal digital assistant (PDA).

In one embodiment, the point of interaction (107) is integrated with a transaction terminal (105). For example, a self-service checkout terminal includes a touch pad to interact with the user (101); and an ATM machine includes a user interface subsystem to interact with the user (101).

Hardware

In one embodiment, a computing apparatus is configured to include some of the components of systems illustrated in various figures, such as the transaction handler (103), the profile generator (121), the media controller (115), the portal (143), the profile selector (129), the advertisement selector (133), the user tracker (113), the correlator, and their associated storage devices, such as the data warehouse (149).

In one embodiment, at least some of the components such as the transaction handler (103), the transaction terminal (105), the point of interaction (107), the user tracker (113), the media controller (115), the correlator (117), the profile generator (121), the profile selector (129), the advertisement selector (133), the portal (143), the issuer processor (145), the acquirer processor (147), and the account identification device (141), can be implemented as a computer system, such as a data processing system (170) illustrated in FIG. 14. Some of the components may share hardware or be combined on a computer system. In one embodiment, a network of computers can be used to implement one or more of the components.

Further, the data illustrated in the figures, such as transaction data (109), account data (111), transaction profiles (127), and advertisement data (135), can be stored in storage devices of one or more computers accessible to the corresponding components. For example, the transaction data (109) can be stored in the data warehouse (149) that can be implemented as a data processing system illustrated in FIG. 14, with more or fewer components.

In one embodiment, the transaction handler (103) is a payment processing system, or a payment card processor, such as a card processor for credit cards, debit cards, etc.

FIG. 14 illustrates a data processing system according to one embodiment. While FIG. 14 illustrates various components of a computer system, it is not intended to represent any particular architecture or manner of interconnecting the components. One embodiment may use other systems that have fewer or more components than those shown in FIG. 14.

In FIG. 14, the data processing system (170) includes an inter-connect (171) (e.g., bus and system core logic), which interconnects a microprocessor(s) (173) and memory (167). The microprocessor (173) is coupled to cache memory (179) in the example of FIG. 14.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method for automatically updating merchant attributes based on a transaction message, comprising:
   generating, by an acquirer processor, a data file comprising:
      a store identifier identifying a store of a merchant; and
      a plurality of merchant attributes associated with the store, wherein the plurality of merchant attributes comprise:
         a merchant identifier; and
         an offer identifier associated with an offer offered across all stores associated with the merchant;
   communicating, by the acquirer processor, the data file to a portal to cause the data file to be stored in a data warehouse in communication with the portal;
   receiving, by the acquirer processor, a transaction message associated with a first transaction, the transaction message communicated from a transaction terminal associated with the store of the merchant, wherein the transaction message comprises:
      first merchant data identifying the merchant; and
      second merchant data identifying a new store associated with the merchant and the first transaction; and
   communicating, by the acquirer processor, the transaction message to the portal to cause the portal to: determine a match between the merchant identifier and the first merchant data; determine a mismatch between the store identifier and the second merchant data; determine that the second merchant data corresponds to a new store associated with the merchant; and update the data file to include a new store entry comprising the offer identifier, the first merchant data, and the second merchant data.

2. The method of claim 1, wherein the transaction message is communicated to the portal via a transaction handler.

3. The method of claim 2, wherein the transaction handler is in communication with a plurality of acquirer processors.

4. The method of claim 1, wherein the store comprises a plurality of transaction terminals, wherein the plurality of merchant attributes associated with the store further comprises a transaction terminal identifier identifying a transaction terminal of the plurality of transaction terminals.

5. The method of claim 1, further comprising:
   generating, by the acquirer processor, an updated data file comprising at least one of an updated store identifier and an updated plurality of merchant attributes; and
   communicating, by the acquirer processor, the updated data file to the portal to cause the portal to update the data file based on the updated data file.

6. The method of claim 1, wherein determining that the second merchant data corresponds to a new store associated with the merchant comprises:
   determining a probability that the second merchant data corresponds to a new store of the merchant; and
   in response to determining that the probability is above a predetermined threshold, determining that the second merchant data corresponds to a new store associated with the merchant.

7. The method of claim 1, wherein the merchant has a plurality of stores at different locations, and the store identifier identifies the store of the merchant among the plurality of stores.

8. A system for automatically updating merchant attributes based on a transaction message, the system comprising an acquirer processor programmed or configured to:
   generate a data file comprising:
      a store identifier identifying a store of a merchant;
      a plurality of merchant attributes associated with the store, wherein the plurality of merchant attributes comprise:
         a merchant identifier; and
         an offer identifier associated with an offer offered across all stores associated with the merchant;
   communicate the data file to a portal to cause the data file to be stored in a data warehouse in communication with the portal;
   receive a transaction message associated with a first transaction, the transaction message communicated from a transaction terminal associated with the store of the merchant, wherein the transaction message comprises:
      first merchant data identifying the merchant; and
      second merchant data identifying a new store associated with the merchant and the first transaction; and
   communicate the transaction message to the portal to cause the portal to: determine a match between the merchant identifier and the first merchant data; determine a mismatch between the store identifier and the second merchant data; determine that the second merchant data corresponds to a new store associated with the merchant; and update the data file to include a new store entry comprising the offer identifier, the first merchant data, and the second merchant data.

9. The system of claim 8, wherein the transaction message is communicated to the portal via a transaction handler.

10. The system of claim 9, wherein the transaction handler is in communication with a plurality of acquirer processors.

11. The system of claim 8, wherein the store comprises a plurality of transaction terminals, wherein the plurality of merchant attributes associated with the store further comprises a transaction terminal identifier identifying a transaction terminal of the plurality of transaction terminals.

12. The system of claim 8, wherein the acquirer processor is further programmed or configured to:

generate an updated data file comprising at least one of an updated store identifier and an updated plurality of merchant attributes; and communicate the updated data file to the portal to cause the portal to update the data file based on the updated data file.

13. The system of claim 8, wherein determining that the second merchant data corresponds to a new store associated with the merchant comprises:

determining a probability that the second merchant data corresponds to a new store of the merchant; and in response to determining that the probability is above a predetermined threshold, determining that the second merchant data corresponds to a new store associated with the merchant.

14. The system of claim 8, wherein the merchant has a plurality of stores at different locations, and the store identifier identifies the store of the merchant among the plurality of stores.

15. A non-transitory computer storage medium for automatically updating merchant attributes based on a transaction message, the non-transitory computer storage medium comprising instructions configured to cause an acquirer processor to:

generate a data file comprising:
- a store identifier identifying a store of a merchant;
- a plurality of merchant attributes associated with the store, wherein the plurality of merchant attributes comprise:
  - a merchant identifier; and
  - an offer identifier associated with an offer offered across all stores associated with the merchant;

communicate the data file to a portal to cause the data file to be stored in a data warehouse in communication with the portal;

receive a transaction message associated with a first transaction, the transaction message communicated from a transaction terminal associated with the store of the merchant, wherein the transaction message comprises:
- first merchant data identifying the merchant; and
- second merchant data identifying a new store associated with the merchant and the first transaction; and communicate the transaction message to the portal to cause the portal to: determine a match between the merchant identifier and the first merchant data; determine a mismatch between the store identifier and the second merchant data; determine that the second merchant data corresponds to a new store associated with the merchant; and update the data file to include a new store entry comprising the offer identifier, the first merchant data, and the second merchant data.

16. The non-transitory computer storage medium of claim 15, wherein the transaction message is communicated to the portal via a transaction handler.

17. The non-transitory computer storage medium of claim 16, wherein the transaction handler is in communication with a plurality of acquirer processors.

18. The non-transitory computer storage medium of claim 15, wherein the instructions are further configured to cause the acquirer processor to:

generate an updated data file comprising at least one of an updated store identifier and an updated plurality of merchant attributes; and communicate the updated data file to the portal to cause the portal to update the data file based on the updated data file.

19. The non-transitory computer storage medium of claim 15, wherein determining that the second merchant data corresponds to a new store associated with the merchant comprises:

determining a probability that the second merchant data corresponds to a new store of the merchant; and in response to determining that the probability is above a predetermined threshold, determining that the second merchant data corresponds to a new store associated with the merchant.

20. The non-transitory computer storage medium of claim 15, wherein the store comprises a plurality of transaction terminals, wherein the plurality of merchant attributes associated with the store further comprises a transaction terminal identifier identifying a transaction terminal of the plurality of transaction terminals.

* * * * *

UNITED STATES PATENT AND TRADEMARK OFFICE
CERTIFICATE OF CORRECTION

PATENT NO. : 10,817,957 B2
APPLICATION NO. : 16/294373
DATED : October 27, 2020
INVENTOR(S) : Ilker Celikyilmaz et al.

Page 1 of 1

It is certified that error appears in the above-identified patent and that said Letters Patent is hereby corrected as shown below:

On the Title Page

Column 1, (Item (73)) Assignee, Line 1, delete "Services" and insert -- Service --

Signed and Sealed this
Twenty-second Day of December, 2020

Andrei Iancu
*Director of the United States Patent and Trademark Office*